United States Patent
Pires De Vasconcelos et al.

(10) Patent No.: US 10,502,850 B2
(45) Date of Patent: Dec. 10, 2019

(54) INTERFEROMETRY-BASED DATA REDATUMING AND/OR DEPTH IMAGING

(71) Applicant: WESTERNGECO L.L.C., Houston, TX (US)

(72) Inventors: Ivan Pires De Vasconcelos, Coton (GB); James E. Rickett, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 1257 days.

(21) Appl. No.: 14/381,888

(22) PCT Filed: Mar. 26, 2013

(86) PCT No.: PCT/IB2013/052410
§ 371 (c)(1),
(2) Date: Aug. 28, 2014

(87) PCT Pub. No.: WO2013/144847
PCT Pub. Date: Oct. 3, 2013

(65) Prior Publication Data
US 2015/0046093 A1    Feb. 12, 2015

Related U.S. Application Data

(60) Provisional application No. 61/616,288, filed on Mar. 27, 2012.

(51) Int. Cl.
*G01V 1/32* (2006.01)
*G01V 1/34* (2006.01)
*G01V 1/30* (2006.01)

(52) U.S. Cl.
CPC .............. *G01V 1/325* (2013.01); *G01V 1/307* (2013.01); *G01V 1/345* (2013.01)

(58) Field of Classification Search
CPC ......... G01V 1/325; G01V 1/345; G01V 1/307
See application file for complete search history.

(56) References Cited

U.S. PATENT DOCUMENTS

| | | | |
|---|---|---|---|
| 5,596,548 | A | 1/1997 | Krebs |
| 6,529,445 | B1 | 3/2003 | Laws |
| 2005/0088913 | A1 | 4/2005 | Lecomte |
| 2006/0262645 | A1 | 11/2006 | Van Baaren |
| 2010/0085050 | A1 | 4/2010 | Dong et al. |

OTHER PUBLICATIONS

Wikipedia: Radar https://web.archive.org/web/20120320122028/https://en.wikipedia.org/wiki/Radar, retrieved by Archive.org on Mar. 20, 2012. (Year: 2012).*

(Continued)

*Primary Examiner* — Alexander Satanovsky
*Assistant Examiner* — Mark I Crohn

(57) ABSTRACT

Processing measurements to create "reflectivity" data at a datum for a target using Joint Point-Spread Functions. The "reflectivity" data can be an image or an extended image. The methods can create single reflectivity data from measurements from multiple experiments, or multiple processed datasets via different processing routes from measurements from a single experiment, or measurements from a single experiment with multiple simultaneous sources.

21 Claims, 15 Drawing Sheets

(56) References Cited

OTHER PUBLICATIONS

Wikipedia: X-Ray https://web.archive.org/web/20120306111625/ https://en.wikipedia.org/wiki/X-ray, retrieved by Archive.org on Mar. 6, 2012. (Year: 2012).*
Van Der Neut, et al., "Deghosting Demultiple, and Deblurring in Controlled-Source Seismic Interferometry", Jan. 1, 2011, International Journal of Geophysics, vol. 75, No. 3, 28 pages.
Wapenaar, et al., "Tutorial on seismic interferometry Part 2: Underlying theory and new advances", Sep. 1, 2010, Society of Exploration Geophysicists, Geophysics, vol. 75, No. 5, pp. 75A211-75A227.
Van Der Neut, "True amplitude interferometric redatuming by multi-dimensional deconvolution and applications for reservoir monitoring", Sep. 18, 2011, SEG Technical Program Expanded Abstracts 2011, pp. 3793-3798.
European Search Report issued in related EP application dated Jun. 7, 2016, 4 pages.
EP Correspondence issued in related EP application 13767671.4 dated Jun. 29, 2016, 5 pages.
International Search Report and Written Opinion of PCT Application No. PCT/IB2013/052410 dated Aug. 13, 2013: pp. 1-13.
De Bruin et al., "Angle-dependent reflectivity by means of prestack migration," Geophysics, Sep. 1990, vol. 66 (9): pp. 1223-1234.
Hunziker et al., "Two-dimensional controlled-source electromagnetic interferometry by multidimensional deconvolution: spatial sampling aspects," Geophysical Prospecting, 2012, vol. 60: pp. 974-994.
Vasconcelos et al., "Nonlinear extended images via image-domain interferometry," Geophysics, Nov.-Dec. 2010, vol. 75(6): pp. SA105-SA115.
Wapenaar et al., "Seismic and electromagnetic controlled-source interferometry in dissipative media," Geophysical Prospecting, 2008, vol. 56: pp. 419-434.
Wapenaar et al., "Seismic interferometry by crosscorrelation and by multidimensional deconvolution: a systematic comparison," Geophys. J. Int., 2011, vol. 185: pp. 1335-1364.

* cited by examiner

US 10,502,850 B2

INTERFEROMETRY-BASED DATA REDATUMING AND/OR DEPTH IMAGING

CROSS-REFERENCE TO RELATED APPLICATIONS

This application is a U. S. National Stage Application under 35 U.S.C. § 371 and claims priority to Patent Cooperation Treaty Application No. PCT/IB2013/052410 filed on Mar. 26, 2013, which claims the benefit of U.S. Provisional Application Ser. No. 61/616,288 filed on Mar. 27, 2012, the disclosures of which are incorporated herein by reference in their entireties for all purposes.

BACKGROUND

This disclosure relates to processing data for imaging for various industries and, in particular, relates to using Joint Point-Spread Functions. More particularly, but not by way of limitation, the disclosure relates to interferometry-based data redatuming and/or depth imaging in seismic surveying.

Imaging technologies are used in many industries to study the structures or properties of a particular object. A source may generate a wave which propagates through a media and is disturbed by the object. A receiver may measure the disturbed wavefield by capturing some energy from the wave. From measurements made at the receiver and the source, it may be possible to obtain an image of the object or derive certain information about the properties of the object. The wave may be any kind of physical wave, such as electromagnetic (e.g. radio wave, X-ray or the like), or mechanical (e.g. ultrasound, acoustic, elastic or the like). The measurements made at the receiver may contain limitations and/or other disturbances (noises) not related to the source. In general, it may be desirable to remove noise and avoid limitations associated with receivers. As such, the measurements made by a receiver may be processed before the measurements are used to produce images of the object.

Imaging technologies may be used in natural resource exploration, remote sensor, monitoring or surveillance, non-destructive testing, biological or medical diagnosis or treatment etc. In imaging technologies, it may be desirable to remediate data acquisition limitations and improve qualities of data and resulting images.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In this disclosure, methods of processing data for imaging are taught, especially methods to use Joint Point-Spread Functions ("JPSF"). In embodiments of the present invention, several different types of measurement data received from the same target object may be utilized together to yield a single redatumed imaged set of "reflectivity" data. In embodiments of the present invention, the different types of measurement data may be acquired by different types of sensors, different arrangements of similar sensors, or different processing methods, and each type of measurement may have different advantages and disadvantages that may be compensated among themselves. In an embodiment of the present invention, the resulting single redatumed set of data or image generated from the different types of measurement data may not have the limitations associated with an individual type of measurement used to generate single data set/image. In embodiments of the present invention concerning seismic imaging, the image processing methods may be based on interferometry or depth imaging.

BRIEF DESCRIPTION OF DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which.

Figure 1A:
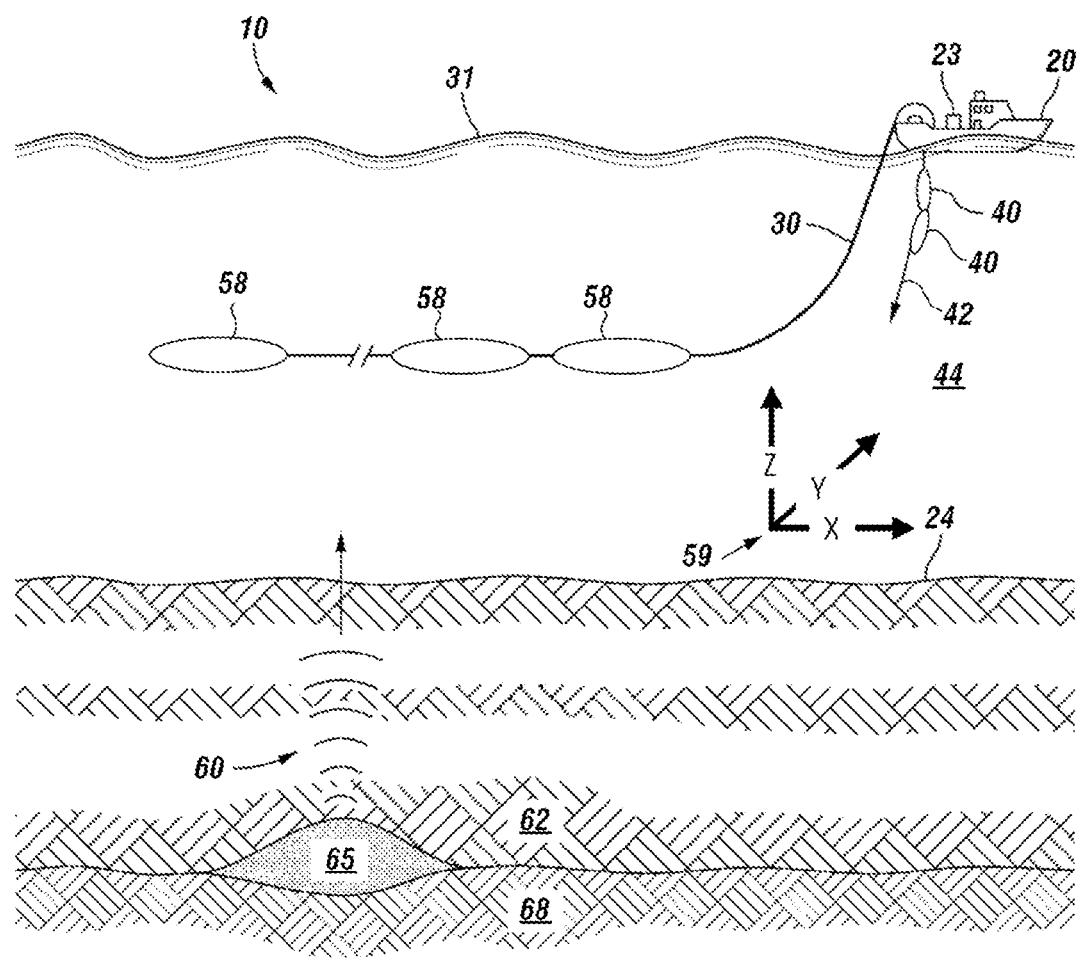
FIG. 1a illustrates a data acquisition system for a marine seismic survey.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates three data acquisition systems in different industries. The data acquired using the systems is processed and used to construct images for various uses.

FIG. 1a illustrates a data acquisition system for a marine seismic survey. In the system 10, a survey vessel 20 tows one or more seismic streamers 30 (one streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread.

The seismic streamers 30 may be several thousand meters long and may contain various support cables (not shown), as well as wiring and/or circuitry (not shown) that may be used to support communication along the streamers 30. In general, each streamer 30 includes a primary cable into which seismic sensors that record seismic data are mounted. The streamers 30 contain seismic sensors 58, which may be hydrophones to acquire pressure data or multi-component sensors. For example, sensors 58 may be multi-component sensors; each sensor may be capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

The marine seismic data acquisition system 10 includes one or more seismic sources 40 (two seismic sources 40 being depicted in FIG. 1), such as air guns and the like. The seismic sources 40 may be coupled to, or towed by, the survey vessel 20. The seismic sources 40 may operate independently of the survey vessel 20 in that the sources 40 may be coupled to other vessels or buoys, as just a few examples.

As the seismic streamers 30 are towed behind the survey vessel 20, acoustic signals 42 (an acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations (or targets), such as a formation 65 that is depicted in FIG. 1.

The incident acoustic signals 42 that are generated by the sources 40 produce corresponding reflected acoustic signals that are reflected by the targets, or pressure waves 60, which are sensed by the seismic sensors 58. It is noted that the pressure waves that are received and sensed by the seismic sensors 58 include "up going" pressure waves that propagate to the sensors 58 without reflection from the air-water boundary 31, as well as "down going" pressure waves that are produced by reflections of the pressure waves 60 from an air-water boundary 31.

The goal of the seismic acquisition is to build up an image of a survey area for purposes of identifying subterranean geological formations (targets), such as the geological formation 65. Subsequent analysis of the representation may reveal probable locations of hydrocarbon deposits in subterranean geological formations. Depending on the particular survey design, portions of the analysis of the representation may be performed on the seismic survey vessel 20, such as by the signal processing unit 23. In other surveys, the representation may be processed by a seismic data processing system.

Figure 1B:
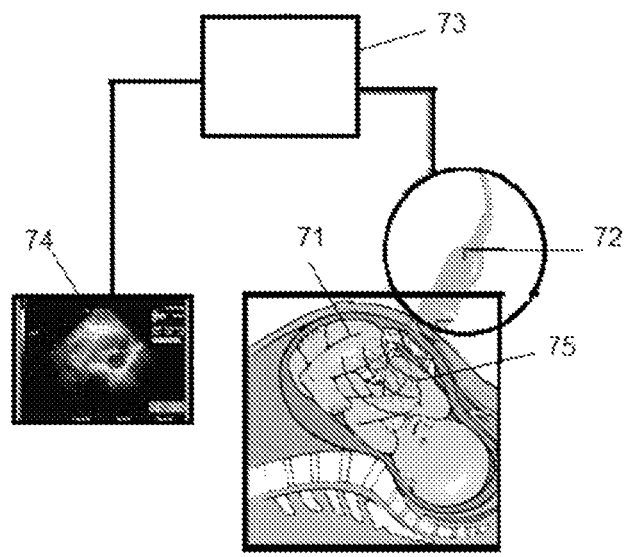
FIG. 1b illustrates a system for ultrasound imaging data acquisition, processing and display.

FIG. 1b illustrates an ultrasound imaging data acquisition, processing and display system. The target 71 (a fetus) is to be imaged by using a transducer 72, which includes both a source and a receiver. The transmitted signal and received reflection signal (ultrasound waves 75) from the transducer 72 are sent to a processor 73. The processor 73 collects and processes the signals and converts them into a human visible image 74 and displays the image 74 on a screen. A medical care-giver may use the image 74 to monitor the condition of the fetus. In this system, the primary wave is an ultrasound wave.

Figure 1C:
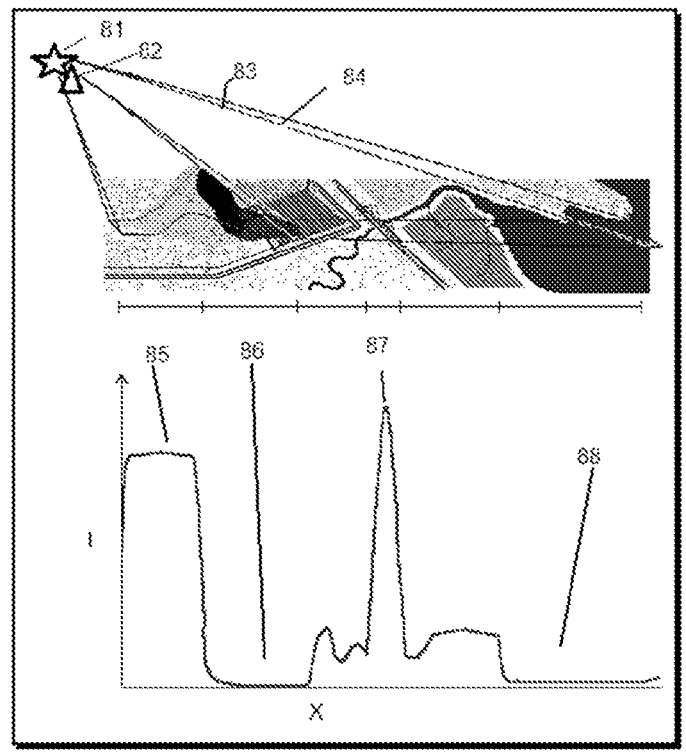
FIG. 1c illustrates a radio detection and ranging ("RADAR") system.

FIG. 1c illustrates a radio detection and ranging (RADAR) system. The sources 81 and receivers 82 are mounted on a structure above ground (e.g. on a stationary mountain top or a moving airplane). The source signals 83 are reflected by various objects on the ground and become reflected signals 84, which are received by receivers 82. The reflected signals 84 may have various intensities due to the characteristics of the objects and time delays due to the distances. The bottom chart in FIG. 1c is an intensity I versus distance X chart in one azimuth direction. The areas 85 and 86 may indicate a mountain side and its shadow. The narrow peak 87 may indicate the metal railway tracks. The plane 88 may indicate an area of open water. By combining many reflected signals at many directions/locations, an image of the area above ground can be constructed. Using similar radio waves, a ground penetrating radar may image the subsurface structures.

For simplicity, all examples described below are related to seismic imaging in seismic exploration in a reflective arrangement where the sources and the receivers are on the same side of the target, and where the waves emitted by sources are reflected by the target and received by receivers. However, the methods are equally applicable to any imaging application in any arrangement, as long as the waves emitted by the sources are disturbed in some way by the target and the disturbed waves are received by the receivers. For example, the methods are applicable in medical imaging, remote sensing, radar imaging etc. The methods are applicable for a transmission arrangement where the sources and the receivers are on the opposite sides of the target, and where the waves emitted by sources are transmitted through the target and received by receivers. The different waves (propagative or dissipative), sources or receivers in different industries do not affect the wave propagation properties and the imaging processes. In seismic imaging, the wave is an elastic wave or an acoustic wave. The target is a subsurface geological structure. The sources are elastic or acoustic wave generators (e.g. airguns, vibrators or the like) and the receivers are pressure or particle motion sensors (e.g. geophones, hydrophones, accelerometers or the like).

A datum as in "redatum" refers to a standard position or level that measurements are taken from. Data refers to the measurements or their representations in various formats. Data redatuming refers to a process in which the data are transformed as if the measurements are taken from a new location or a new level. Additionally, a "datum" here includes any geometrically conceivable surface and implies a surface that needs not be horizontal and/or flat.

In section 1, the basic principle and theory of Point Spread Function (PSF) is discussed with respect to an integral format or a matrix format. In section 2, using the same format, a new Joint Point Spread Function (Joint PSF or JPSF) is introduced. JPSF can be used in redatuming or Extended Images. In section 3, JPSF is used in the context of simultaneous sources. In section 4, JPSF is used in the context of multiple measurements of the same target or pseudo "multiple" measurements of that target, or some combination of the above tasks. In section 5, a couple of numeric examples are presented.

(1) Retrieving Reflectivity Via PSF-Based Multidimensional Deconvolution

In this section, the basic principles and theory of Point-Spread Function are discussed. The basic principles of Point-Spread Function may be known, but they are not known in the current context.

Figure 2A:
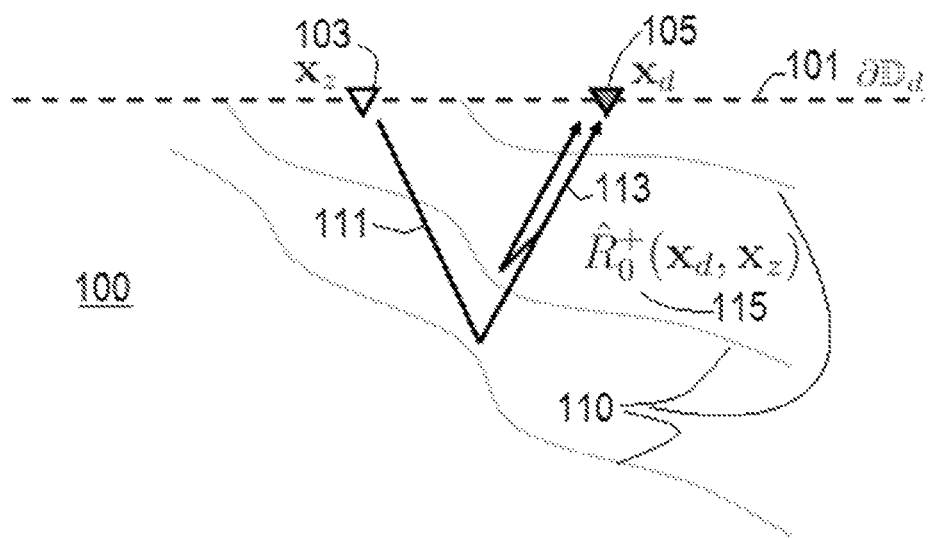
FIG. 2a illustrates a reflectivity operator $R_0^+$, which may be viewed as an imaging system with sources and receivers, and targets to be imaged.

Let the objective of redatuming or imaging be the retrieval of the so-called reflectivity operator $R_0^+$. The meaning of the reflectivity operator (henceforth referred to as "Reflectivity Data") is illustrated in FIG. 2a: it consists of the full up-going impulse wave response between points on a given datum (e.g., a plane in 3D), as if the medium above that datum consists of a homogeneous half-space. This concept is valid for elastic waves in arbitrary heterogeneous, anisotropic and attenuative media, and it also applies to diffusive or propagating electromagnetic fields. The R-operator can be used for interferometric redatuming, as well as for generating extended image gathers.

Regardless of the governing wave equation, be it propagating wave equation or diffusive wave equation, the reflectivity operator $R_0^+$ and its relationship with the acquired data, or the resulting images are the same.

FIG. 2a is an illustration of reflectivity operator $R_0^+$ 115, and it describes a system 100 including the full up-going reflection response 113 between all possible locations for the point pairs $x_z$ 103 and $x_d$ 105 on a datum $\partial D_d$ 101. FIG. 2a can be a representation of an Ocean Bottom Survey if $x_z$ 103 and $x_d$ 105 represent a seismic source and receiver, respectively, and if the datum $\partial D_d$ 101 is on the ocean bottom. The gray lines 110 in FIG. 2a may be subsurface reflectors. When $x_z$ 103 and $x_d$ 105 coincide, R-operator 115 represents an interferometric operator. When $x_z$ 103 and $x_d$ 105 coincide on a subsurface reflector 110, R-operator 115 represents an image operator for the reflector 110.

Figure 2B:
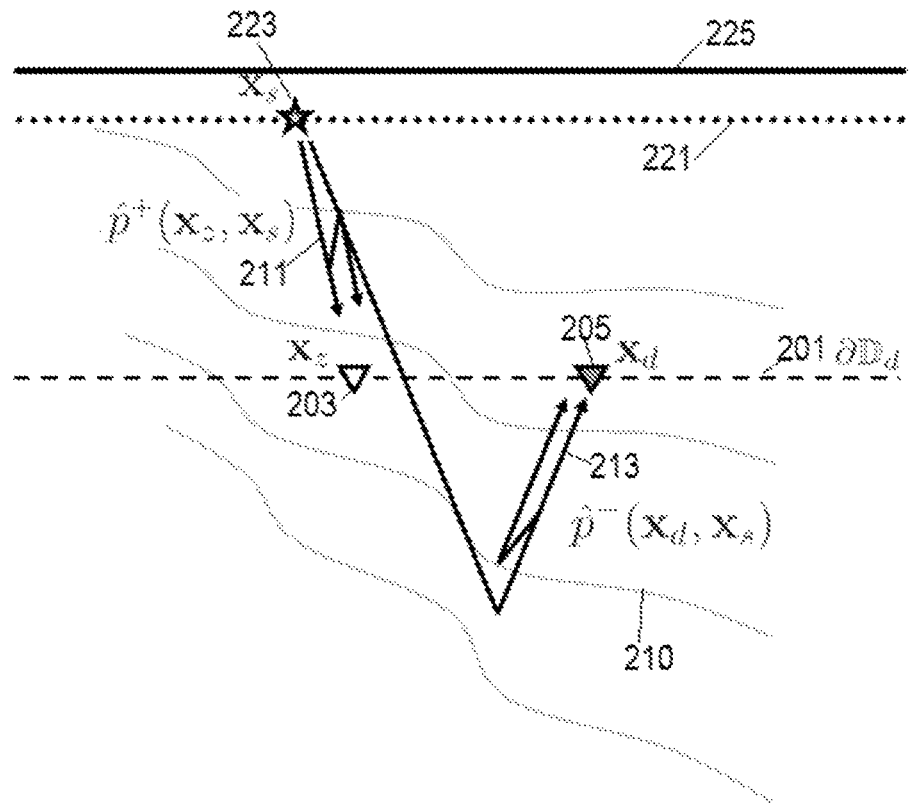
FIG. 2b illustrates another system with down- and up-going fields recorded at a subsurface datum.

Referring to FIG. 2b, the Reflectivity data are given by:

$$\hat{p}^-(x_d, x_s) = \int_{x \in \partial D_d} \hat{R}_0^+(x_d, x_z) \hat{p}^+(x_z, x_s) d^2 x_z \quad (1)$$

where the fields $p^+$ 211 and $p^-$ 213 are, respectively, down- and up-going fields recorded at the subsurface datum 201, excited by a remote source at $x_s$ 223 placed above the recoding level 201. $\hat{R}_0^+(x_d, x_s)$ 215 (not shown in FIG. 2b) is the reflective operator. Here, as well as in all other equations, the quantities are assumed to be in the frequency domain (denoted by the "^" symbol). However, the formulation and method are equally valid and applicable in other domains, e.g., in the time domain. For more details on the derivation of Eq 1 regarding various types of wavefields, e.g. acoustic wavefields in fluids, electromagnetic wave or diffusion fields in matter, elastodynamic fields in solids, seismoelectric waves in porous solid etc., one may refer to the Appendix of Wapenaar et al., "*Seismic and Electromagnetic Controlled-Source Interferometry in Dissipative Media*," GEOPHYSICAL PROSPECTING, 56, 419-434 (2008), which is incorporated by reference herein.

FIG. 2b may represent various seismic survey arrangements. As an example, in a marine seismic survey, the top solid line 225 may represent a free surface; the dotted line 221 may represent a source level where a source 223 (a star) may excite seismic waves; and the dashed line 201 may be a receiver level where receivers 205 record seismic waves. The dashed line may also be a datum $\partial D_d$ 201 where no actual receivers are placed (e.g. when only virtual receivers 203 are present).

For a plurality of sources $x_s$ 223, Eq 1 can be expressed in matrix form at each frequency:

$$P_- = R_0^+ P^+ \quad (2)$$

where the matrices $P^{-,+}$ have dimensions proportional to the number of sources in the column space and receivers in the row space, and $R_0^+$ has dimensions determined by the number of $x_z$ and $x_d$ points on the datum level.

From Eq 2, the Reflectivity Data $R_0^+$ can be estimated by direct inversion of the matrix $P^+$. An alternative approach is to solve for reflectivity using the so-called normal equations. With that objective, we define:

$$C^-(x_d, x_z) = \int_{x_s \in \partial D_s} \hat{p}^-(x_d, x_s)\{\hat{p}^+(x_z, x_s)\}^* d^2 x_s \tag{3}$$

$$\Gamma^+(x_d, x_z) = \int_{x_s \in \partial D_s} \hat{p}^+(x_d, x_s)\{\hat{p}^+(x_z, x_s)\}^* d^2 x_s \tag{4}$$

which, in matrix form, correspond to $$\underbrace{P^-(P^+)^\dagger}_{C^-} = R_0^+ \underbrace{P^+(P^+)^\dagger}_{\Gamma^+} \tag{5}$$

$$C^- = R_0^+ \Gamma^+ \tag{6}$$

where the "dagger" superscript denotes the conjugate-transpose (adjoint) matrix. Here, the matrix $\Gamma^+$ is a Point-Spread Function (PSF) associated with the down-going fields.

Using Eq 6, the Reflectivity Data may be retrieved via inversion of $\Gamma^+$. This inversion is henceforth referred to as multi-dimensional deconvolution ("MDD"). One of the many solutions to this problem is obtained via the Tikhonov Least-Squares inverse:

$$\overline{R}_0^+ = C^-(\Gamma^+)^\dagger [\Gamma^+(\Gamma^+)^\dagger + \epsilon^2 \Lambda']^{-1} \tag{7}$$

with $\Lambda'$ being any desired regularization/shaping operator. This is a non-limiting example of how the inversion may be conducted. Other solutions may be more practical and/or accurate; these solutions may include the use of external constraints to solve the deconvolution problem (e.g., geologic information from borehole data).

The left hand side of Eq 7 is referred to as the Reflectivity Data because most seismic data are measurements of reflections by subsurface structures. However, they actually represent the target and are independent from the type of sources or receivers, or the temporal or spatial arrangement of the experiments. As discussed below, at certain time/location, the Reflectivity Data may be referred to as an image or an extended image.

(2) Multiple Wavefields and Joint Point-Spread Functions (JPSFs)

Using elements from the formulation above, a new formulation and method can be developed. This new method can combine information from multiple, separate, independent wavefields, acquired/observed over the same subsurface into a joint inversion for a single set of Reflectivity Data $R_0^+$.

Let there be two or more separate sets of wavefields, given by e.g.

$$\hat{p}_{(1)}^-(x_d, x_s^{(1)}) = \int_{x_z \in \partial D_d} \hat{R}_0^+(x_d, x_z)\hat{p}_{(1)}^+(x_z, x_s^{(1)}) d^2 x_z$$

$$\hat{p}_{(2)}^-(x_d, x_s^{(2)}) = \int_{x_z \in \partial D_d} \hat{R}_0^+(x_d, x_z)\hat{p}_{(2)}^+(x_z, x_s^{(2)}) d^2 x_z \tag{8}$$

where the field sets p(1) and p(2) can have arbitrarily different source geometries and/or arbitrarily different source radiation/time-frequency signatures. Note, however, that the fields share the same observation point locations on the target datum $\partial D_d$.

When considering many sources for the separate wavefield sets in Eq 8, we can write the matrix system:

$$\underbrace{\begin{bmatrix} w_1 P_{(1)}^- \\ w_2 P_{(2)}^- \end{bmatrix}}_{P_J^-} = R_{0,J}^+ \underbrace{\begin{bmatrix} w_1 P_{(1)}^+ \\ w_1 P_{(2)}^+ \end{bmatrix}}_{P_J^+} \tag{9}$$

where the block-matrices $P_J$ are the so-called Joint Wavefield Matrices; with $w_{1,2}$ being arbitrarily chosen complex-valued, frequency-dependent weights. They can be arranged as a block matrix by placing the fields in the row space (as in Eq 9) or alternatively in the column space:

$$\underbrace{[w_1 P_{(1)}^- \quad w_2 P_{(2)}^-]}_{P_J^-} = R_{0,J}^+ \underbrace{[w_1 P_{(1)}^+ \quad w_2 P_{(2)}^+]}_{P_J^+} \tag{9b}$$

From Eqs (9) and/or (9b), we define $$\underbrace{P_J^-(P_J^+)^\dagger}_{C_J^-} = R_{0,J}^+ \underbrace{P_J^+(P_J^+)^\dagger}_{\Gamma_J^+} \tag{10}$$

$$C_J^- = R_{0,J}^+ \Gamma_J^+ \tag{10b}$$

where now $\Gamma_J^+$ is henceforth referred to as the Joint Point-Spread Function (JPSF). Eq 10b has a similar form to Eq 6, however, the matrices corresponding to Eq 6 for each of the wavefield sets appear as block elements in the system given by Eq 10b, i.e., for row-space JPSFs, Furthermore, Eq 10 or 10b may be expanded as:

$$\underbrace{\begin{bmatrix} w_1^2 C_{(1)}^- & w_1 w_2 P_{(1)}^-(P_{(2)}^+)^\dagger \\ w_1 w_2 P_{(2)}^-(P_{(1)}^+)^\dagger & w_2^2 C_{(2)}^- \end{bmatrix}}_{C_J^-} = \tag{11}$$

$$R_{0,J}^+ \underbrace{\begin{bmatrix} w_1^2 \Gamma_{(1)}^+ & w_1 w_2 P_{(1)}^+(P_{(2)}^+)^\dagger \\ w_1 w_2 P_{(2)}^+(P_{(1)}^+)^\dagger & w_2^2 \Gamma_{(2)}^+ \end{bmatrix}}_{\Gamma_J^+}$$

where the off-diagonal block elements in this system describe cross-talk between the different wavefields from each experiment. The resulting matrix $R_{0,J}^+$ is block-diagonal with the desired $R_0^+$ equally repeated at every diagonal block. Thus, when solving the system in Eq 11 numerically, it is convenient to enforce that the inverted matrix $R_{0,J}^+$ be block-diagonal, with minimum differences between all block diagonal elements (this can be done, e.g., via an appropriate choice of $\Lambda$ in Eq 7, which may also contain additional smoothing/shaping characteristics). For column-space wavefield block-matrices Eq 9b, the JPSF system is given by:

$$\underbrace{\sum_{i=1}^N w_i^2 C_{(i)}^-}_{C_J^-} = R_0^+ \underbrace{\left(\sum_{i=1}^N w_i^2 \Gamma_i^+\right)}_{\Gamma_J^+} \tag{11b}$$

noting that, in this case, the matrix $R_{0,J}^+$ is the desired $R_0^+$.

In addition, joint wavefield systems can be combined in both row and column spaces, with the resulting JPSF block matrix system then being an appropriate combination of those in Eqs 11 and 11b.

The inverted Extended Images are obtained from the JPSF system in Eq 10b via multidimensional deconvolution (MDD). Using the block joint matrices $\dot{P}_J^{-,+}$ (Eq 9b), the MDD can be carried out in the same way as for the single-experiment system in Eq 6, i.e., $$\hat{R}_{0,LS}^+ = \hat{C}_J \hat{\Gamma}_{J_?}^{\ddagger} \quad (11c)$$

where $\hat{R}_{0,LS}^+$ denotes a least-squares estimate of $\hat{R}_0^+$ and $\hat{\Gamma}_J^{\ddagger}$ represents a pseudoinverse of obtained by, e.g. Tikhonov regularization, truncated SVD, or any other methods. The image condition in Eq 11c states the reflectivity Extended Image is obtained by the multichannel deconvolution of the correlation-based Extended Image for the joint wavefield with the JPSF An alternative deconvolution-based imaging condition can be formulated for the joint wavefield system from Eq 5 by using the direct least-squares solution for underdetermined system, given by $$\hat{R}_{0,MN}^+ = \hat{P}_J^- [(\hat{\Gamma}_J^u)^{-1} (\hat{P}_J^+)^\dagger] \quad (11d)$$

where now $\hat{R}_{0,MN}^+$ is the minimum norm estimate of $\hat{R}_0^+$, and $\hat{\Gamma}_J^u = (\hat{P}_J^+)^\dagger \hat{P}_J^+$ is the JPSF for the underdetermined problem, thus given by $$\hat{\Gamma}_J^u \begin{bmatrix} |\hat{w}_1|^2 \hat{\Gamma}_{(1)}^u & \hat{w}_1^* \hat{w}_2 (\hat{P}_{(1)}^+)^\dagger \hat{P}_{(2)}^+ \\ \hat{w}_1 \hat{w}_2^* (\hat{P}_{(2)}^+)^\dagger \hat{P}_{(1)}^+ & |\hat{w}_2|^2 \hat{\Gamma}_{(2)}^u \end{bmatrix} \quad (11e)$$

With $\hat{\Gamma}_{(i)}^u = (\hat{P}_{(i)}^+)^\dagger \hat{P}_{(i)}^+$.

The estimation of Reflectivity data via JPSFs using Eqs 11, 11b, 11c and/or 11d can be used in many different contexts: for example, in redatuming and imaging.

(2.1) Redatuming Using Joint Point-Spread Functions (JPSFs)

Figure 3:
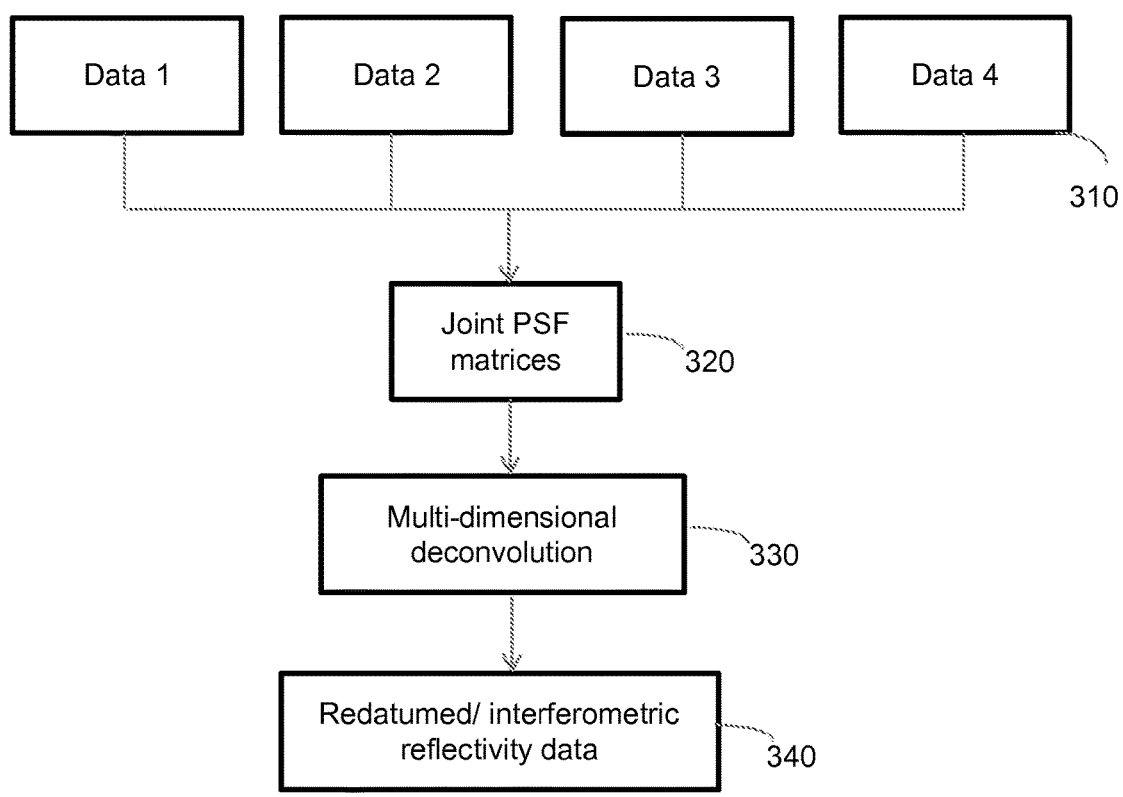
FIG. 3 illustrates a diagram outlining a method for interferometric redatuming using the JPSF.

In the case where the points on $x_d$ and $x_z$ on the target datum (FIGS. 1 and 2) coincide with the locations of actual observation points (i.e., where receivers are placed), interferometry by MDD allows for the retrieval of Reflectivity data as if one or more of the receivers acts as an impulsive source of down-going-only energy. Using the JPSF method described above, we can jointly redatum from multiple separate experiments into a single Reflectivity dataset describing impulsive waves propagating between the receivers. FIG. 3 illustrates a general scheme for estimating a single set of Reflectivity data from multiple experiments using the JPSFs for interferometric redatuming. It is a diagram outlining the method for interferometric redatuming using the JPSF method.

In these methods, several datasets (e.g. four datasets are shown in FIG. 3) are received at step 310; they are combined and rearranged into Joint PSF matrices, as in Eq 11 or 11b in step 320; the Joint PSF matrices are inverted, e.g. as in Eq 7, using any inversion methods or MDD in step 330; the result 340 of the inversion 330 is the redatumed, interferometric reflectivity data $R_0^+$. As mentioned earlier, all matrix computations are done in frequency domain. If the input data and the resulting data are in time domain, then straight forward data transformation between time domain and frequency domain may be necessary.

The data used in this method may need to have their wavefield separated between up-going and down-going waves before they are combined using Eq 11. If necessary, any wavefield separation methods may be used. Non-limiting examples of wavefield separation are offered in Wapenaar et al., 2008, "Seismic and electromagnetic controlled-source interferometry in dissipative media", *Geophysical Prospecting*, 56, 419-434, which are incorporated by reference.

(2.2) Generating Extended Images (EIs) Using Joint Point-Spread Functions (JPSFs)

Interferometry by MDD can also be used in imaging to generate the so-called Extended Images (EIs), or Extended Image Gathers (EIGs). An image corresponds to the reflective data where $x_z$ coincides with $x_d$ at time zero. An Extended Image corresponds to Reflectivity data where $x_z$ may or may not coincide with $x_d$ at a time which may or may not be zero. As in this particular case, referring to FIG. 2b, an Extended Image corresponds to Reflectivity data retrieved at a datum within the subsurface where no real sources or receivers are present.

Using the JPSF-based method described above for imaging, Eq 11 defines a novel Extended Imaging condition that jointly retrieves a single set of EIs from multiple independent experiments. In this imaging context, the fields $p^{+,-}$ do not correspond to observed data (as they do in the context of redatuming): p+ are the so-called source wavefields, modeled directly from acquisition parameters and using an estimate of the subsurface parameters; p− are the so-called receiver wavefields, which are obtained from the observed data via wavefield extrapolation using estimated subsurface parameters. The general steps for generating EIs using the JPSF approach are shown in FIG. 4.

Figure 4:
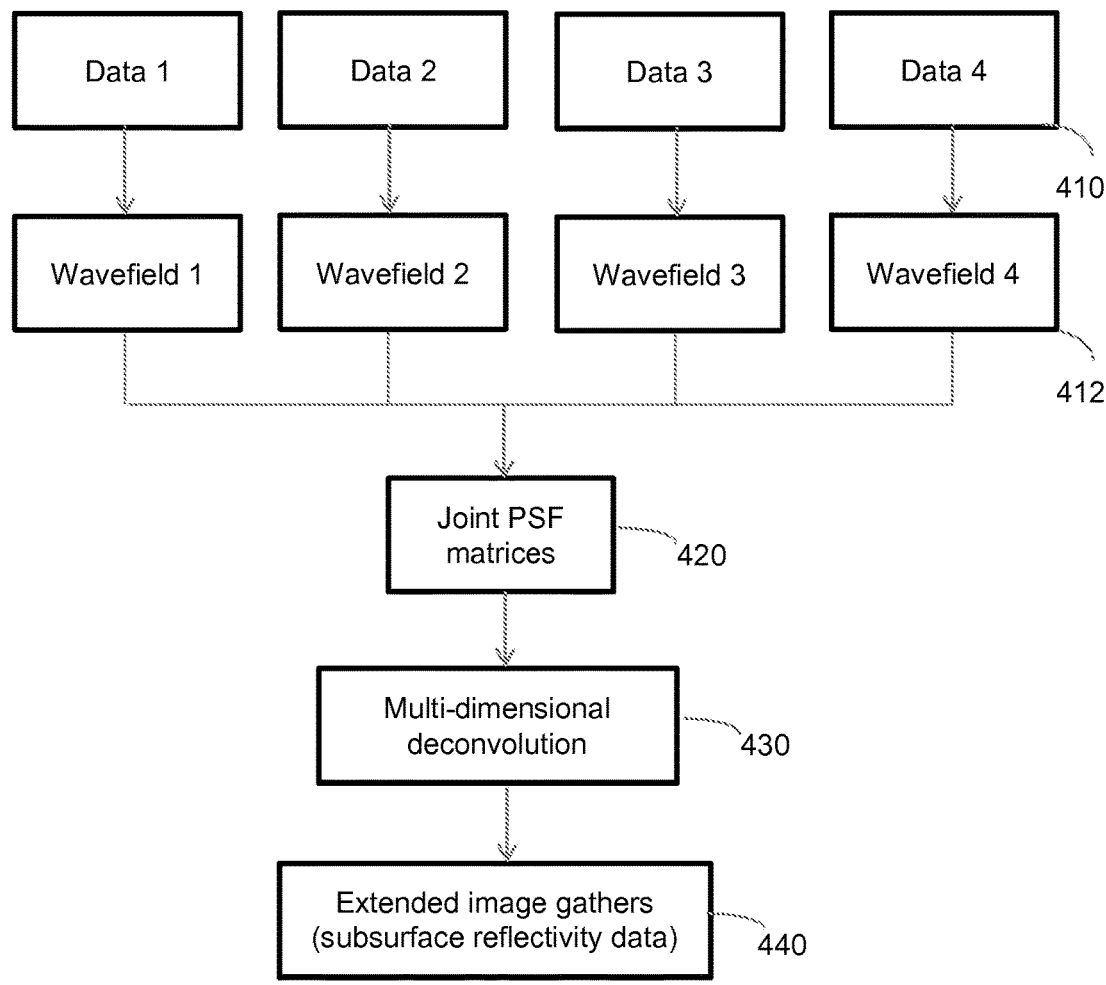
FIG. 4 illustrates a diagram outlining a method for generating Extended Image gathers using a JPSF.

In this example as shown in FIG. 4, four datasets are received in step 410; in step 412, the data in each dataset are extrapolated to the subsurface to obtain the corresponding source wavefield and the receiver wavefield; in step 420, the wavefields are combined to form Joint PSF matrices, as in Eq 11 or 11b; in step 430, inversion or MDD is performed; the result 440 is the subsurface reflectivity data, in this context, it is the Extended Image Gathers.

In the context of imaging, each of the separate $C^-_{(1,2)}$ matrices in the diagonal Eq 11 are correlation-based EIG. Likewise, each corresponding $\Gamma^-_{(1,2)}$ matrix is the PSF that describes the distortion of each correlation EIG from the subsurface reflectivity response (the "true" EI). The off-diagonal terms in the JPSF system in Eq 11 describe various crosstalk terms between the different experiments in the retrieval of a single true-amplitude, Reflectivity-based EI.

There is no restriction on any particular method or formulation for wavefield extrapolation. With an adequate choice of wavefield extrapolation, the JPSF method yields true amplitude subsurface-domain Extended Images.

(3) Simultaneous/Blended-Source Redatuming and Imaging

The JPSF approach allows for both interferometric redatuming and/or imaging of two or more experiments acquired with ensembles of arbitrarily configured simultaneous/blended sources. In this case, the main advantage of the approach is that it does not require simultaneous source (SimSource) data to be separated into single sources as a pre-processing step.

Let the simultaneous source data, corresponding to a particular experiment indicated by the subscript (1), at the target datum be given by $$\hat{p}_{(1),sim}^{-,+} = \hat{p}_{(1),sim}^{-,+}(x_d, e_s^{(1)}) \quad (12)$$

where $e_s$ denotes one simultaneous source ensemble. Assuming there are many SimSource ensembles, each with arbitrary source locations and arbitrary excitation functions (whose characteristics may vary from one ensemble to the next), we evaluate $$C_{(1),sim}^-(x_d,x_z) = \int_{e_s^{(1)}} \hat{p}_{(1),sim}^-(x_d,e_s^{(1)}) \{\hat{p}_{(1),sim}^+(x_z,e_s^{(1)})\}^* d^2 e_s^{(1)} \quad (13)$$

$$\Gamma_{(1),sim}^+(x_d,x_z) = \int_{e_s^{(1)}} \hat{p}_{(1),sim}^+(x_d,e_s^{(1)}) \{\hat{p}_{(1),sim}^+(x_z,e_s^{(1)})\}^* d^2 e_s^{(1)} \quad (14)$$

which are in turn used to form the system $$\underbrace{\begin{bmatrix} C_{(1),sim}^- & P_{(1),sim}^-(P_{(2),sim}^+)^\dagger \\ P_{(2),sim}^-(P_{(1),sim}^+)^\dagger & C_{(2),sim}^- \end{bmatrix}}_{C_{J,sim}^-} = \quad (15)$$

$$R_{0,J}^+ \underbrace{\begin{bmatrix} \Gamma_{(1),sim}^+ & P_{(1),sim}^+(P_{(2),sim}^+)^\dagger \\ P_{(2),sim}^+(P_{(1),sim}^+)^\dagger & \Gamma_{(2),sim}^+ \end{bmatrix}}_{\Gamma_{J,sim}^+}$$

where $\Gamma^+_{J,sim}$ is the JPSF accounting for multiple SimSource experiments (indicated by the numbered subscripts (1, 2, . . . , N)). Note that $\Gamma^+_{(1,2),sim}$ are the individual PSFs corresponding to each separate simultaneous source experiment as in Eq 14. Equally, this can be done for column-space wavefield matrices using Eq 11b.

It is noted that the $R^+_{0,J}$ in Eq 15 has the exact same contents as that in Eqs 2, 6 or 11. This implies that the JPSF approach described here can fully account for SimSource effects, including all cross-talk effects, to yield impulsive, source-separated (de-blended) Reflectivity data at the target datum. It is noted that this method may be used to obtain source-separated (de-blended) Reflectivity data at the target datum from a single SimSource experiment.

As with the single-source formulation above, this SimSource JPSF approach can also be employed for interferometric redatuming or for imaging: these are described below and by the diagrams shown in FIGS. 5 and 6, respectively. In the case of interferometric redatuming, it is not necessary to know the characteristics of simultaneous source ensembles (e.g., each ensemble's source locations, excitation functions, etc.). However, to generate Extended Image gathers, the characteristic details of source ensembles need to be known. They are used for the modeling of source wavefields which are used for construction of the JPSFs.

Figure 5:
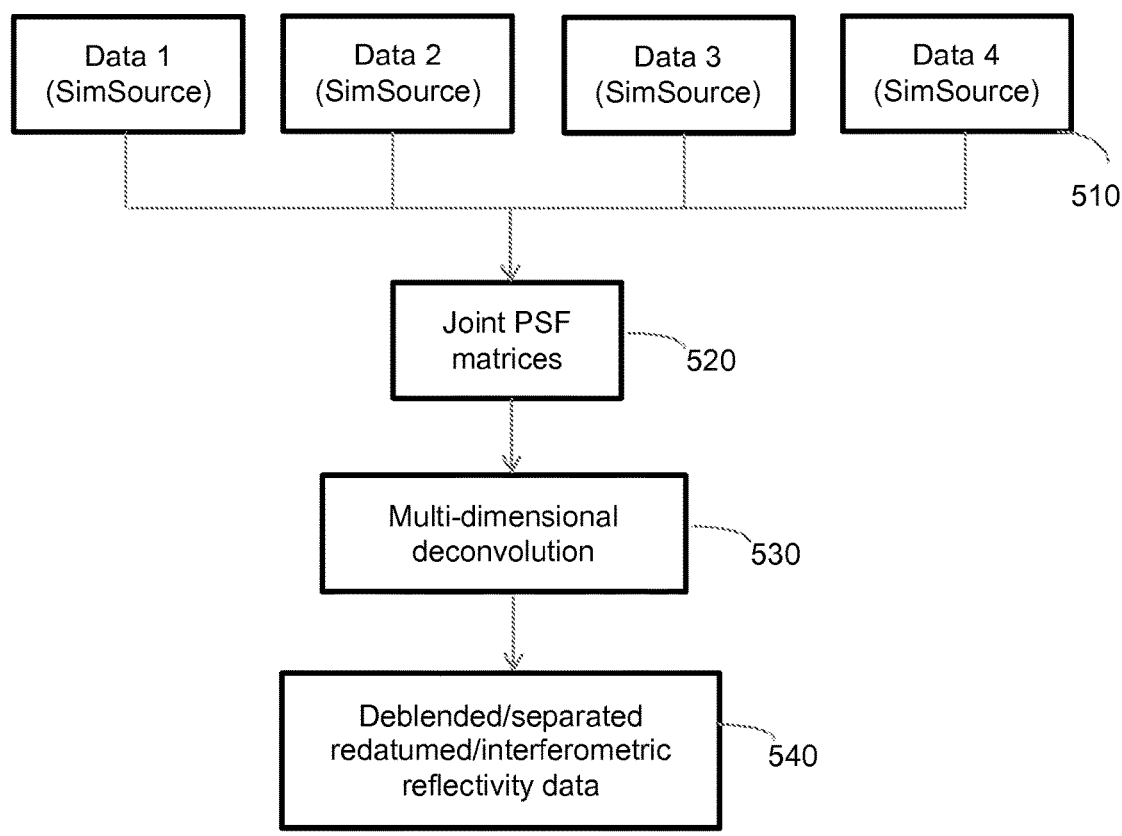
FIG. 5 illustrates a diagram outlining a method for interferometric redatuming of simultaneous source data using a JPSF, in accordance with an embodiment of the present invention.

FIG. 5 illustrates a diagram outlining a method for interferometric redatuming of simultaneous source data using the JPSF method. These procedures are almost the same as the procedures illustrated in FIG. 3. In these methods, several datasets acquired from SimSource survey are received at step 510; they are combined into Joint PSF matrices, as in Eq 15 in step 520; the Joint PSF matrices are inverted, i.e. a multi-dimensional deconvolution is performed, e.g. as in Eq 7, using any inversion methods in step 530; and the result 340 of the inversion 530 is the redatumed, interferometric reflectivity data $R_0^+$. The only difference here is that the input datasets are SimSource data and resulting redatumed interferometric reflectivity data are source-separated (de-blended) reflectivity data.

Figure 6:
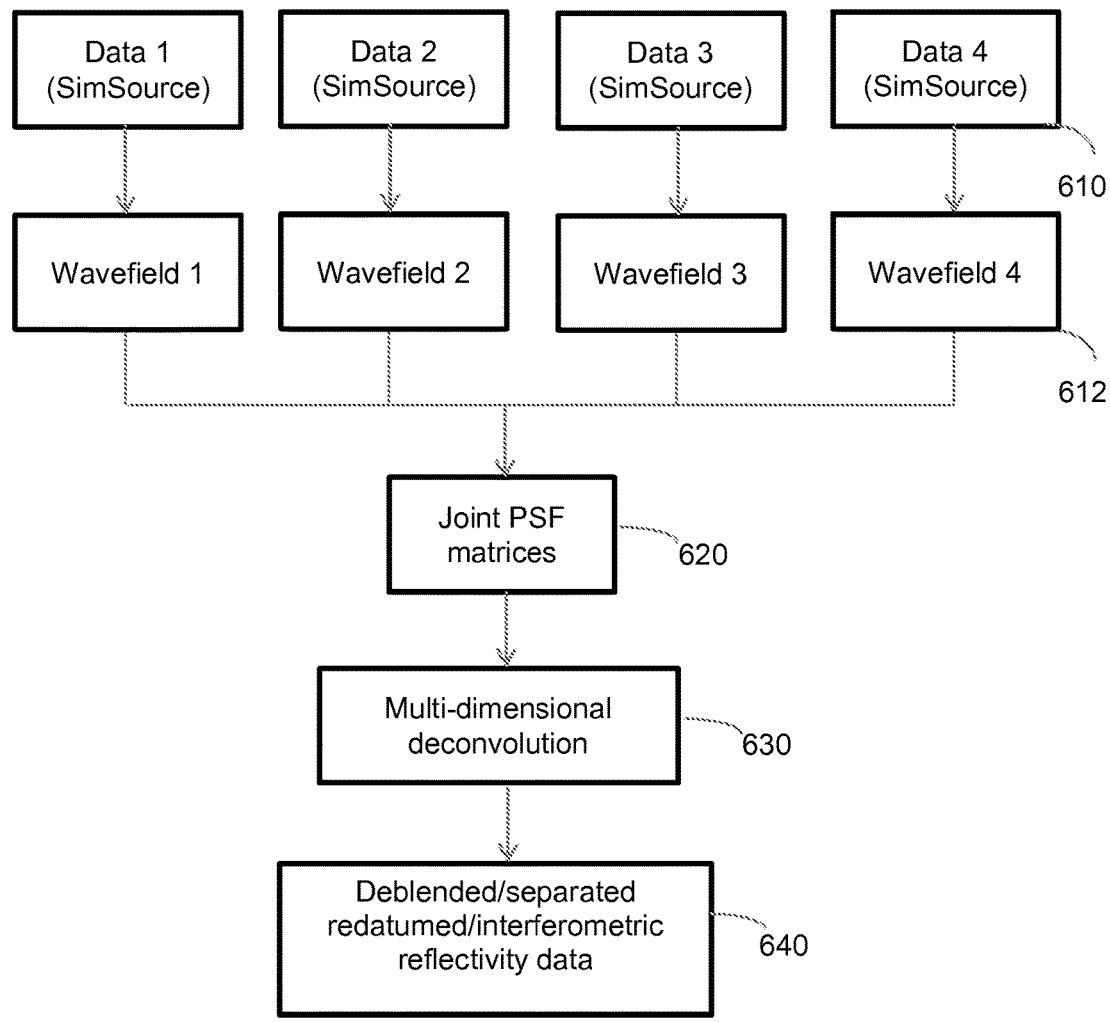
FIG. 6 illustrates a diagram outlining a method for generating Extended Image gathers from simultaneous source data using a JPSF, in accordance with an embodiment of the present invention.

FIG. 6 illustrates a diagram outlining a method for generating Extended Image gathers from simultaneous source data using the JPSF method. In this example, as shown in FIG. 6, four datasets are received in step 610; in step 612, the data in each dataset are extrapolated to the subsurface to obtain the corresponding source and receiver wavefields; in step 620, as in Eq 15, the wavefields are combined to form Joint PSF matrices; in step 630, inversion or Multi-dimensional deconvolution is performed; and the result 640 is the subsurface reflectivity data, in this context, it is the Extended Image Gathers.

(4) More Applications

The JPSF methods described above may be used in other imaging processes. Below are several more non-limiting example applications of the described methods.

(4.1) Interferometric Redatuming and/or Depth Imaging of 4-Component Acoustic Data Using Joint Point-Spread Functions (JPSFs)

Figure 7A:
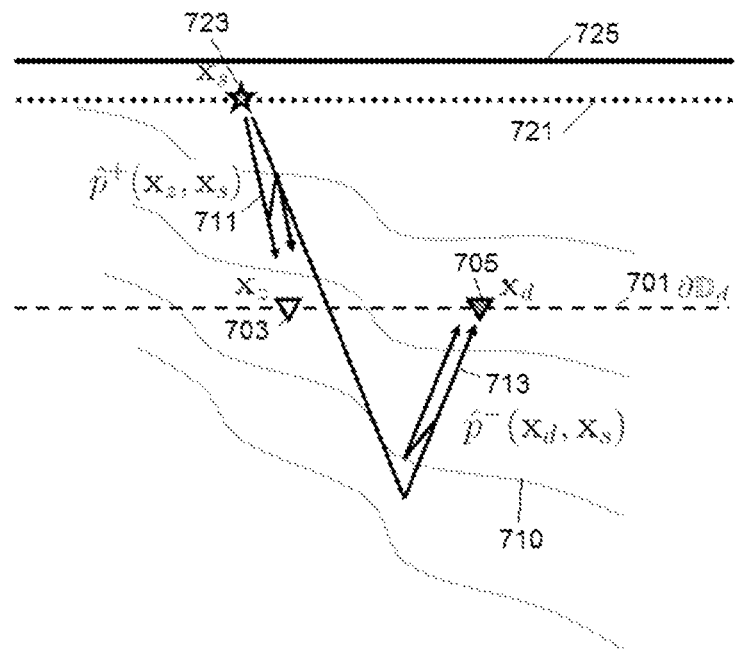
FIGS. 7a and 7b illustrate systems for interferometry redatuming or depth imaging of 4-component acoustic data using a JPST and the associated waves and fields, in accordance with embodiments of the present invention.
Figure 7B:
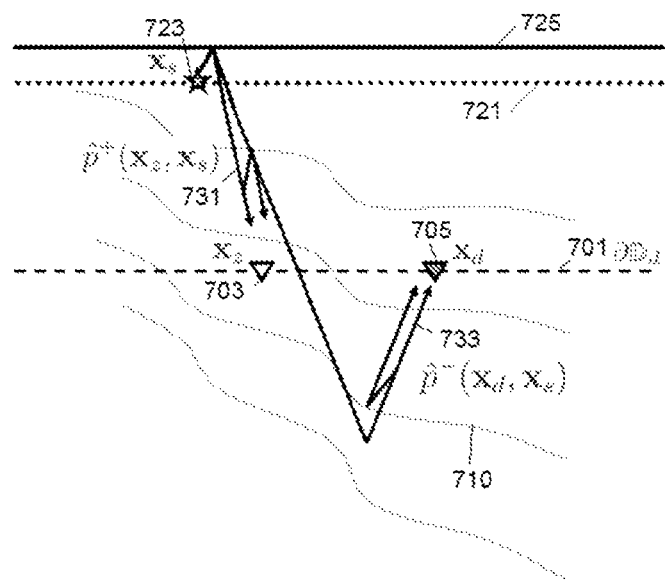

This is illustrated in FIGS. 7a and 7b. FIG. 7a illustrates the source-side down-going wave (or direct reflection), which may include $p^{+,-}$ fields 711, i.e., receiver-side down-going field and $p^{-,-}$ fields 713, the up-going fields. FIG. 7b illustrates the source-side up-going wave (or ghost radiation), which may include $p^{+,-}$ fields 731, i.e., receiver-side down-going field and $p^{-,-}$ fields 733, the up-going fields. The solid line 725 at the top denotes the free-surface. In the event where the data consist of ensembles of marine 4-component seismic data (e.g., pressure and three components of particle displacement/velocity/acceleration; also referred to as vector-acoustic data), we assume that these data can be separated into receiver-side up-going and down-going components at the receiver datum or at some other target datum (in the imaging case). In addition, assuming sufficiently deeply-towed marine sources below the free-surface 725, we assume an additional source-side decomposition of the fields into down-going (e.g. 711 and 713) or "ghost" (i.e., up-going) radiation (e.g. 731 and 733).

This decomposition of the $p^{+,-}$ fields into source-side down-going and ghost radiated fields can also be separately accounted for in the case of monopole (i.e., pressure) or dipole (e.g., gradient) marine sources. When data from both marine source types are available, the decomposition illustrated in FIG. 7 yields the following data matrix representation:

$$\begin{bmatrix} P_{mon,down}^{-,T} \\ P_{mon,ghost}^{-,T} \\ P_{dip,down}^{-,T} \\ P_{dip,ghost}^{-,T} \end{bmatrix}^T = R_0^+ \begin{bmatrix} P_{mon,down}^{+,T} \\ P_{mon,ghost}^{+,T} \\ P_{dip,down}^{+,T} \\ P_{dip,ghost}^{+,T} \end{bmatrix}^T \quad (16)$$

where the subscripts (mon, dip) refer to marine monopole and dipole sources, and (down, ghost) refer to their separate radiation components as either down-going (as in FIG. 7a) or "ghost" (as in FIG. 7b). The joint data matrix system in Eq 16 has the same structure as the matrix system in Eq (9b), and thus immediately defines the joint data matrices $P_J^{+,-}$. Therefore, from Eq 16 we can immediately generate a four-by-four block-matrix JPSF system analogous to that in Eq 11, which can then be inverted for Reflectivity data. Eq 16 is in terms of column-space wavefields (see Eq 9b), but can equally be arranged in row-space as in Eq 9.

It is noted that the joint data matrix representation in Eq 16 has the following features:
While Eq 16 includes both monopole and dipole source data, it can also be used with either source type. The sources may have arbitrary temporal and spatial radiation characteristics. There is no specific requirement of the sources. Similarly, the receivers may have an arbitrary temporal and spatial transfer function.

The system and corresponding JPSF solution can be applied both in the contexts of:
(1) Interferometric redatuming: when the fields are directly decomposed and considered at the physical datum of receiver arrays; or
(2) Depth imaging: when the fields are reconstructed at a subsurface datum from the appropriate four-component acoustic data via vector-acoustic extrapolation, as discussed above related to Eq 11 and Eq 11b and FIGS. 3 and 4.

The system can be applied for redatuming/imaging either for conventional or simultaneous source acquisition: in which case the JPSF system is formed from Eq 16 via Eqs 13 and 14.

The system in Eq 16 does not require the positions of monopole and source positions to coincide, i.e., they can be arbitrarily different.

The solution of the system in Eq 16 performs deconvolution of arbitrary source excitation functions, i.e.: the time-frequency character of source excitation functions can vary arbitrarily with source type and position.

For redatuming, source excitation functions need not be known a priori; while for imaging, source excitation functions are needed for generation of source wavefields (i.e., $P^+$ matrices).

These features are also applicable if the data being processed comprises simultaneous source data.

(4.2) Joint Depth Imaging/Inversion of Multiple Geophysical Datasets Using Joint Point-Spread Functions (JPSFs)

The JPSF formulation can be used for generating a single set of Reflectivity image gathers, or Extended Images, for one or more target areas in the subsurface, over which several different types of geophysical data are available. This is illustrated with examples in FIG. 8.

Figure 8:
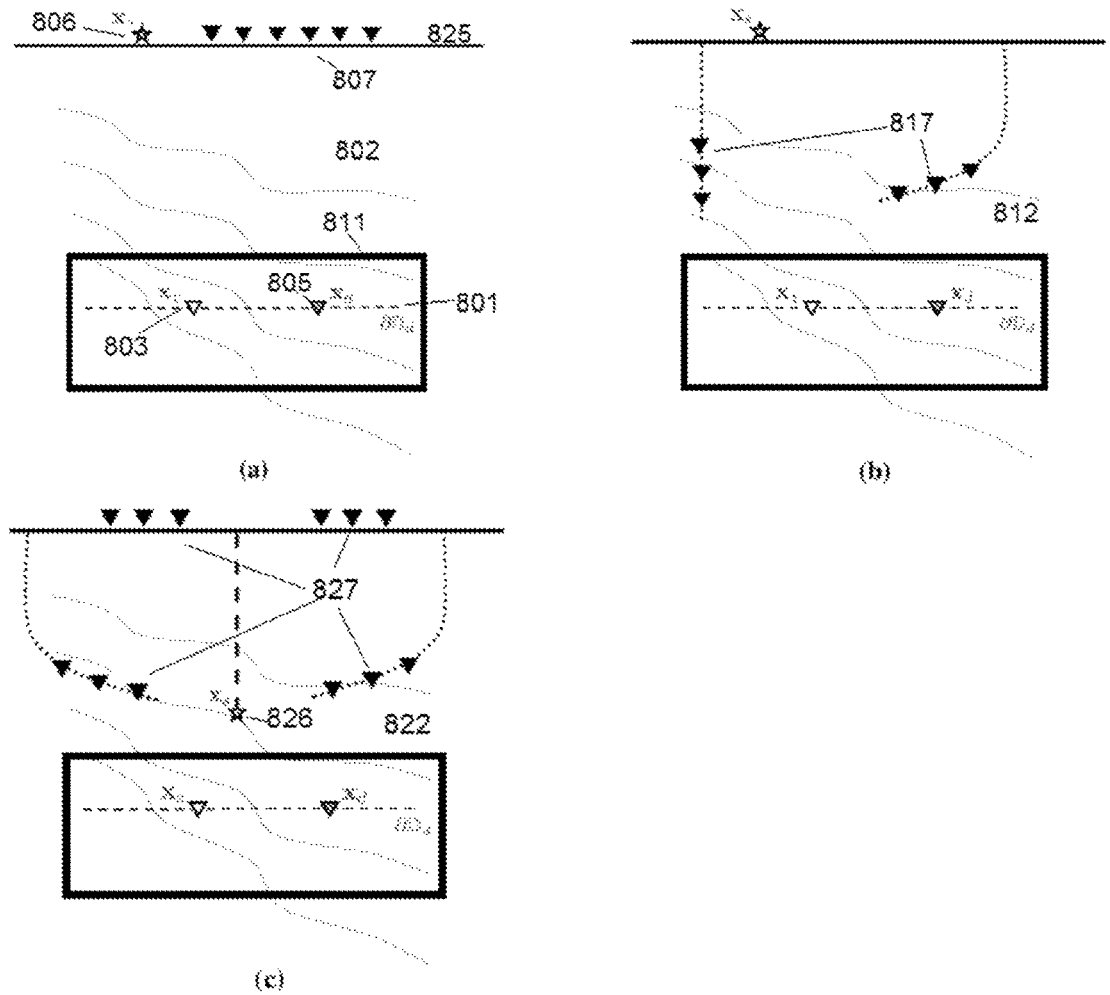
FIGS. 8a-c illustrate several different seismic systems over a common subsurface target.

FIG. 8 shows examples of different seismic experiments over a common subsurface target. The box 811 denotes a subsurface area of interest, wherein arbitrary target datum levels can be defined, e.g., ∂Dd 801. Data are observed by receivers 807 indicated by black inverted triangles excited by one or more discrete source 806 locations $x_s$ (denoted by the grey star). Different experiment types are illustrated in each panel: Panel a) shows a typical surface seismic geometry 802 in which both sources 806 and receivers 807 are on the Earth surface 825; Panel b) depicts a vertical seismic profile (VSP) configuration 812 in which the receivers 817 are in wells; while Panel c) represents a seismic-while-drilling (SWD) acquisition 822 (thick dashed line denotes drilling well), in which receivers 827 are on the surface or in wells and sources 826 may also be on the surface or in wells.

Prior to forming a JPSF system, we assume that for each separate experiment (e.g., FIGS. 8a, 8b and 8c) it is possible to generate suitable source and receiver wavefields via wavefield extrapolation methods of choice; this yields, respectively, the matrices $P^+$ and $P^-$ at the same subsurface target datum. This allows us to form a joint data matrix system such as $$\begin{bmatrix} [P_{surf}^{-,T}]^T \\ P_{obc}^{-,T} \\ P_{vsp}^{-,T} \\ P_{swd}^{-,T} \end{bmatrix} = R_0^+ \begin{bmatrix} [P_{surf}^{+,T}]^T \\ P_{obc}^{+,T} \\ P_{vsp}^{+,T} \\ P_{swd}^{+,T} \end{bmatrix} \quad (17)$$

where the subscripts denote different types of geophysical experiments, e.g.: "surf" corresponds to surface seismic, "obc" denotes ocean bottom cable data, and "vsp" and "swd" stand for vertical seismic profile and seismic-while-drilling, respectively. The experiments in Eq 17 are non-limiting examples and serve the purpose of illustrating how multiple types of geophysical data are organized in the joint data matrix approach.

The joint data matrix system in Eq 17 has the same structure as the matrix system in Eq (9b), and thus immediately defines the joint data matrices $P_J^{+,-}$. Therefore, from Eq 17 we can immediately generate a four-by-four block-matrix JPSF system analogous to that in Eq 11, which can then be inverted for Reflectivity-based Extended Images. Eq 17 is in terms of column-space wavefields (see Eq 9b), but it can equally be arranged in row-space as in Eq 9.

Figure 9:
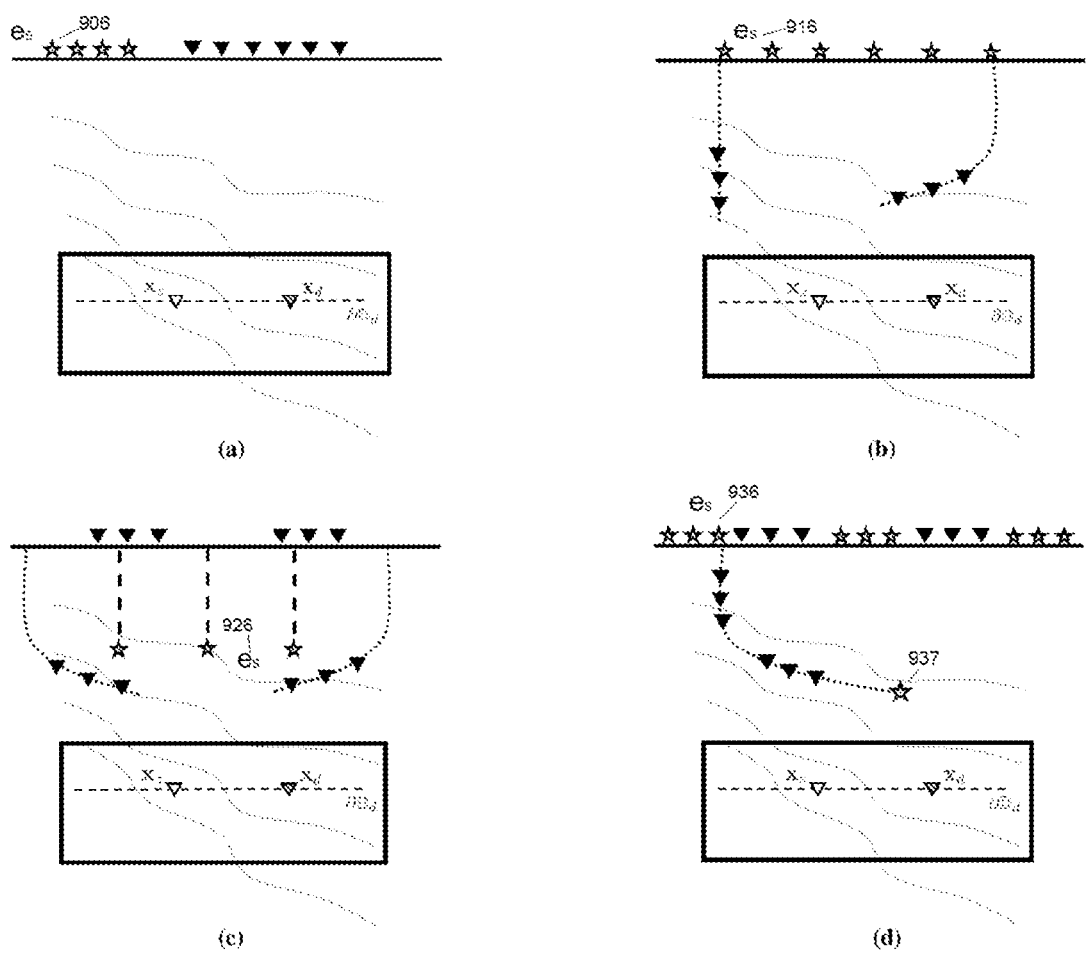
FIG. 9 illustrates several different seismic systems over a common subsurface target; the systems are similar to those illustrated in FIG. 8, but with simultaneous sources, in accordance with an embodiment of the present invention.

It is noted that the joint data matrix representation in Eq 17 is similar to Eq 16, which is related to simultaneous source acquisition. Many observations regarding Eq 16 are also applicable for a system represented by Eq 17:

The system can be applied for imaging either for conventional or simultaneous source acquisition: in which case the JPSF system is formed from Eq 17 via Eqs 13 and 14. A few examples of simultaneous source experiments are shown in FIG. 9;

The system in Eq 17 does not require the positions of sources in different experiments to coincide, i.e., they can, in principle, be arbitrarily different;

The solution of the system in Eq 17 performs deconvolution of arbitrary source excitation functions, i.e.: the time-frequency character of source excitation functions can vary arbitrarily with source type and position;

For imaging, source excitation functions (and simultaneous source configurations) are needed for generation of source wavefields (i.e., $P^+$ matrices); and The receiver wavefields P– can be previously corrected for receiver-array-induced illumination bias via pre-computed filters (suitable filters can be chosen according to specific applications).

Furthermore, the retrieved reflectivity-based Extended Image Gathers: are, in principle, true-amplitude and suitable for reservoir characterization (e.g., local AVO/waveform inversion); are fully source-separated (i.e., de-blended); and are suitable for model-building/velocity analysis.

FIG. 9 shows examples of different seismic experiments over a common subsurface target, as in FIG. 8, but using simultaneous source experiments ($e_s$ denotes a discrete simultaneous source ensemble): Panel a) shows a simultaneous-source 906 surface seismic geometry; Panel b) depicts a simultaneous-source 916 vertical seismic profile (VSP) configuration; Panel c) represents a seismic-while-drilling (SWD) acquisition with multiple wells being drilled simultaneously 926; while Panel d) shows an experiment during which multiple seismic sources 936 are fired simultaneously with the noise 937 excited by an active drilling well. The same procedures shown in FIG. 8 may be used for the example shown in FIG. 9, which is similar to the procedures discussed in relation to FIGS. 5 and 6.

(4.3) Data-to-Data Processing (Demultiple, Deblending, Regularization) of Multiple Wavefield Data Using Joint Point-Spread Functions (JPSFs)

Figure 10:
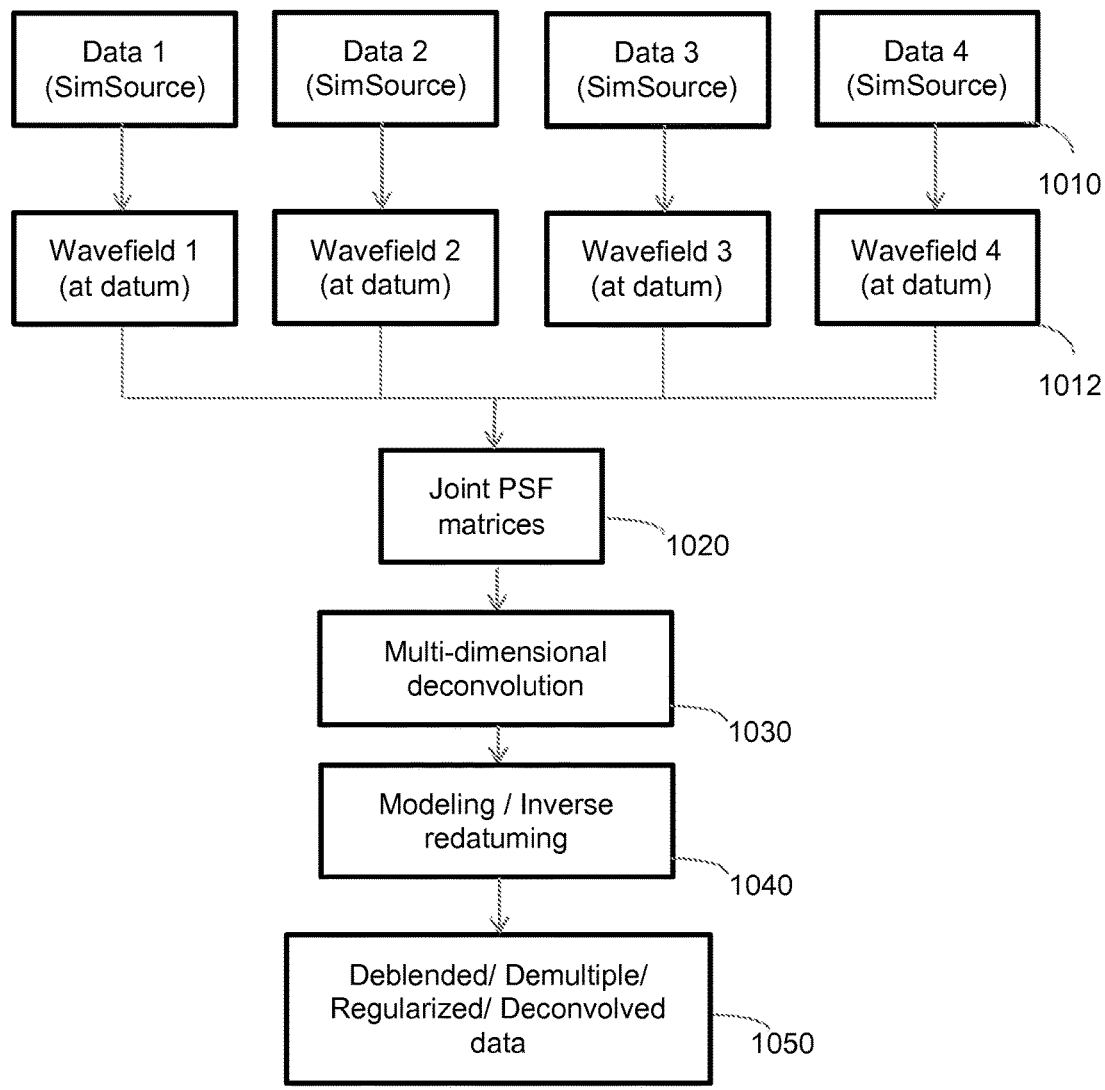
FIG. 10 illustrates a diagram outlining a method for using a JPSF where the results are in the same datum as the original measured data, in accordance with an embodiment of the present invention.

Referring to FIG. 10, another use of JPSF is to combine the modeling/redatuming procedure with MDD to yield processed data at the same datum as the original acquisition. The process as outlined in FIG. 10 is done in the following manner:

(1) Start with original observed multiple-wavefield data at 1010;

(2) Apply extrapolation (e.g., redatuming) to place multiple wavefields at chosen datum at 1012;

(3) Construct JPSF at 1020;

(4) Perform MDD at 1030;

(5) Perform inverse or approximate redatuming of Reflectivity data from 1030 at 1040;

(6) Place the resulting data 1050 at the original datum of the observed data.

In this method, several tasks are accomplished: demultiple, deblending, data regularization and/or source signature deconvolution, depending on the desired application and on the input multiple-wavefield data. This is an alternative to direct interferometric redatuming, as described in application 4.1) above, when the spatial and temporal sampling of the acquired data does not allow for direct MDD applications.

(4.4) Depth Imaging Using Multiple Imaging Methods Using Joint Point-Spread Functions (JPSFs)

Figure 11:
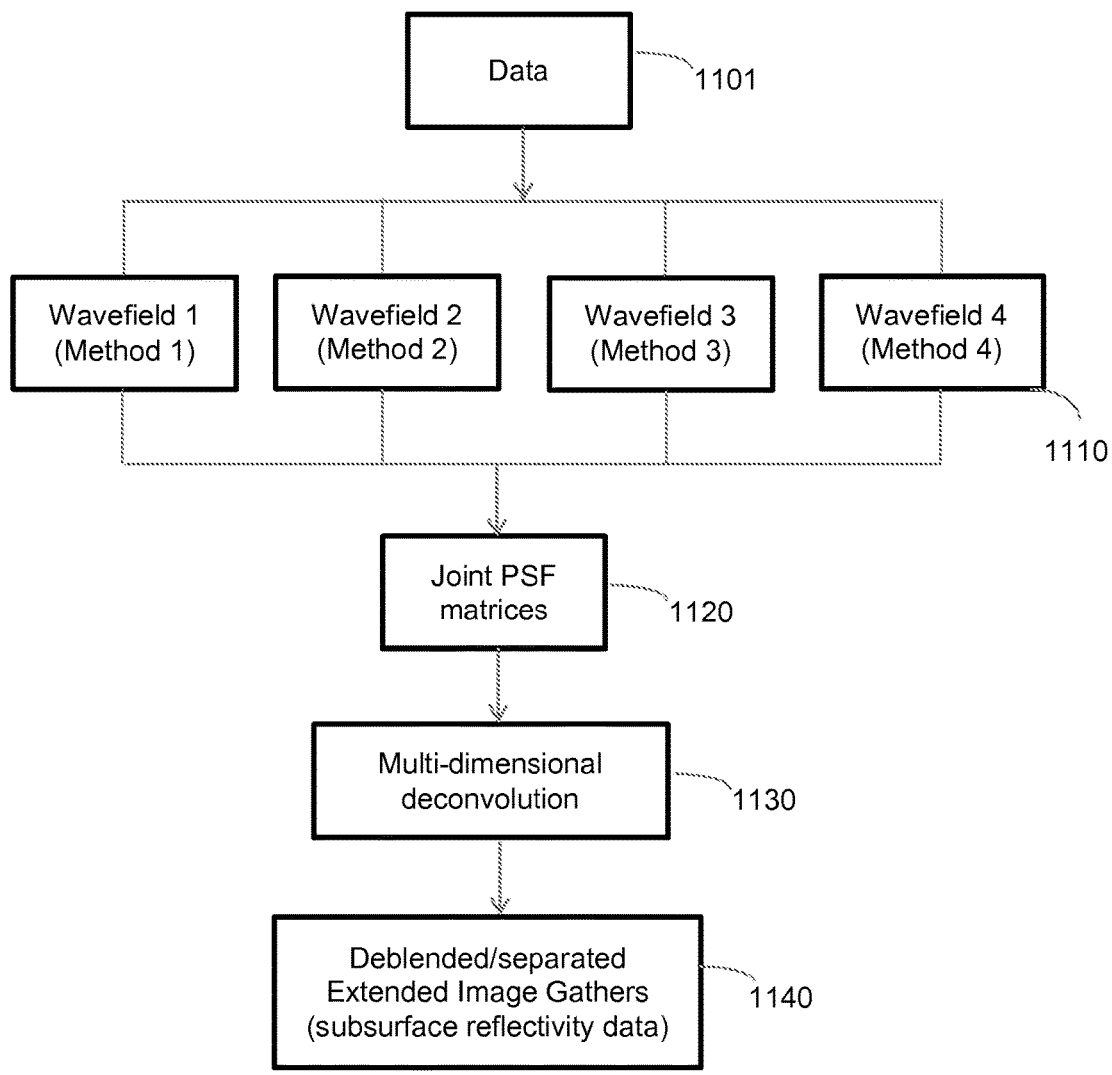
FIG. 11 illustrates a diagram outlining a method for using JPSF where the resulting reflectivity gathers are from a single original measured data set but use multiple redatuming/wavefield extrapolations, in accordance with an embodiment of the present invention.

Illustrated in FIGS. 8 and 9, data from multiple experiments are used to generate a single combined dataset. Referring to FIG. 11, a single dataset may also be generated from a "single" dataset that has been processed many times and in many different ways. These multiple different methods can be any redatuming/wavefield extrapolation methods. Examples are: asymptotic/ray-based redatuming, one-way extrapolation, reverse-time extrapolation, data-based (model-independent) extrapolation, matrix-operator extrapolation, etc.

FIG. 11 outlines the steps of this method, as follows:

(1) start with observed data at 1101;

(2) generate multiple subsurface wavefields from data using different extrapolation/redatuming methods 1110;

(3) combine wavefields into JPSF system 1120;

(4) solve for a single set of image gathers at all image locations via multi-dimensional deconvolution using the JPSF system 1130 resulting in a single dataset 1140, which are deblended data, separated Extended Image Gathers or subsurface reflectivity data.

It is noted that any of above discussed methods can be combined with the imaging of multiple data sets as described above.

Once the single Reflectivity Data set is obtained using any one of the above methods, it may be used for many different purposes. Images of the target objects may be generated, physical models of the target objects may also be created or refined, and desired structures may be identified in the target objects. In the case of seismic survey, the subsurface structures may be interpreted to provide guidance for oil field exploration or production.

For simplicity, the resulting data of the target is called Reflectivity Data, even if the experiment is set in a transmission arrangement, where the waves are transmitted through the target rather than reflected by the target.

For seismic exploration, the experiments may be done in different times, such as in a series of time-lapse experiments. The target's characters and properties may vary.

These methods may have several common features:

1. multiple wavefields are used, each at chosen datum, these may have either:

Separate direct measurements of multiple wavefields from different experiments (e.g., passive, active, SimSource, discrete sources), all observed at the same datum; or Multiple wavefields from separate experiments with completely different experiment configurations (e.g., source and receiver locations/types, source excitation, etc), obtained at chosen datum via any adequate wavefield extrapolation method;

2. Construct a so-called Joint Point-Spread Function (PSF) system using multiple wavefields (e.g., matrices $C_J$ and $\Gamma_J$ described herein);

3. Obtain single Reflectivity data by Multi-Dimensional Deconvolution (MDD).

The advantages of these methods may include at least:

that they may retrieve full Reflectivity data, i.e., an up-going-only impulse response of the subsurface between two points (either real or virtual observation points) at a desired datum that is free of any multiples related to the free-surface or structure above said datum, and that is true amplitude with respect to subsurface parameters below that datum;

that they may be used for interferometric redatuming/processing, or for broadband depth imaging;

that when used for interferometric redatuming, they may handle active or passive, or possibly simultaneous source (blended, SimSource) data with no need for source separation as a pre-processing step; yielding de-blended, impulsive Reflectivity responses with no multiples from above the chosen datum;

that for imaging, it can jointly use multiple (possibly SimSource) datasets with different acquisition geometries and source properties (e.g., different time frequency signatures, array radiation, SimSource configurations). This can include joint imaging of data such as multi-component surface seismic, VSP, OBC, and seismic-while-drilling;

that they may account for arbitrary elastic heterogeneous, anisotropic and attenuative media because of the general nature;

that they may also be applicable to other fields, e.g., to controlled-source electromagnetics or magnetotellurics;

that they may also be applicable to many other fields in which imaging is performed.

As can be seen from the above derivation and discussion, the specific nature of the R-operator is irrelevant from the matrix formulation and the MDD. Therefore, these methods are valid for any types of R-operators, whether they are ones for elastic media: heterogeneous, anisotropic, or attenuative. The R-operators may be ones for diffusive fields, e.g. controlled-source EM, or magnetotellurics. The R-operators may be ones for any imaging systems.

(5) Numerical Examples

Figure 12:
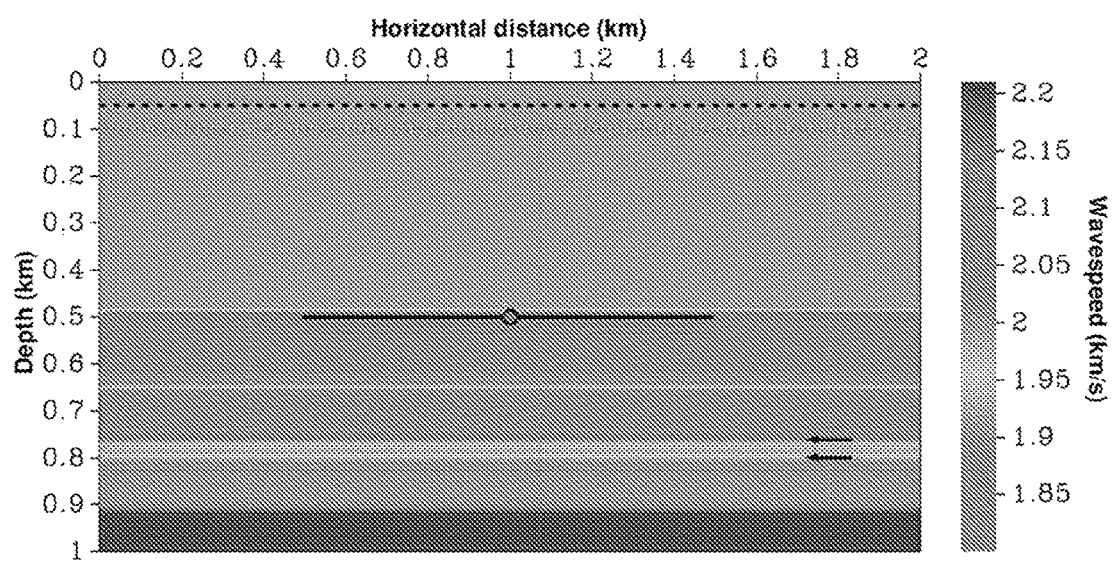
FIG. 12 illustrates a layered model used in testing methods in accordance with embodiments of the present invention.

FIGS. 12-15 illustrate a few numerical examples of using JPSF methods discussed above. FIG. 12 shows a testing model having layers. The modeling is done using acoustic finite-difference simulations for pressure and particle velocity data. Monopole sources are modeled pressure sources with a 20 Hz Ricker source pulse; dipole sources are modeled from the pressure as vertical particle-velocity point forces. FIG. 12 indicates source and receiver locations and coverage; monopole and dipole source locations coincide. Receiver wavefield is extrapolated and the receiver wavefields related to the receiver-side up-going and ghost fields are computed in separate domains. This, with the use of monopole and dipole sources, yields the four sets of wavefields, as shown in Eq 16: up-going fields due to monopole sources, down-going (ghost) fields due to monopole sources, up-going fields due to dipole sources, and down-going (ghost) fields due to dipole sources.

Figure 13:
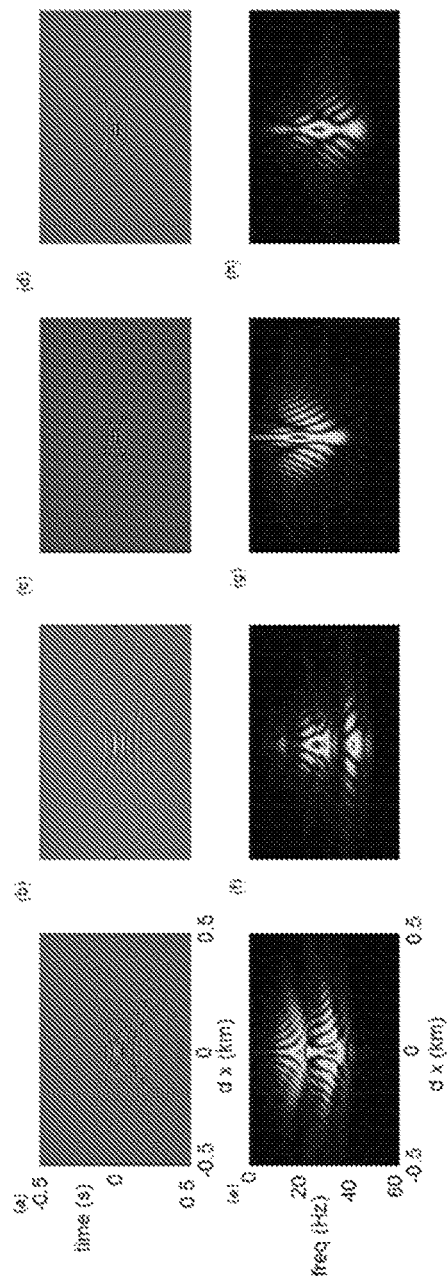
FIG. 13 illustrates differences between components of PSF systems.

When considered separately, each wavefield yields its own PSF system for extended images, (e.g., Eq 2). FIG. 13 illustrates the differences between the components of PSF systems for the up-going field from a monopole source, and the one associated with the receiver-side ghost field from a dipole source. FIGS. 13a and 13e correspond to up-going fields due to monopoles; FIGS. 13c and 13g correspond to down-going (ghost) fields due to monopole sources; FIGS. 13b and 13f correspond to up-going fields due to dipole sources; and FIGS. 13d and 13h correspond to down-going (ghost) fields due to dipole sources. The top panels (a-d) are in space-time domain, while the bottom panels (e-f) are in space-frequency domain. The left panels (FIGS. 13a, b, e and f) are $\hat{C}$s correlation EIs for these fields, and are substantially different in terms of both time- and frequency-space content. The same happens with the PSFs in the right panels $\hat{\Gamma}$s (FIGS. 13c, d, g and h). In both the correlation EIs and the PSFs, we observe that the monopoles $\hat{C}$ and $\hat{\Gamma}$ are richer in lower frequencies, while their dipole counterparts carry stronger higher-frequency content. Note that, when comparing FIGS. 13c and 13d, the PSFs account for the crosstalk between source-side ghost and down-going radiation: this appears as an event at nonzero time that is causal in FIG. 13c and anti-causal in FIG. 13d. The imprint of these can be seen in FIGS. 13a and 13b.

Figure 14:
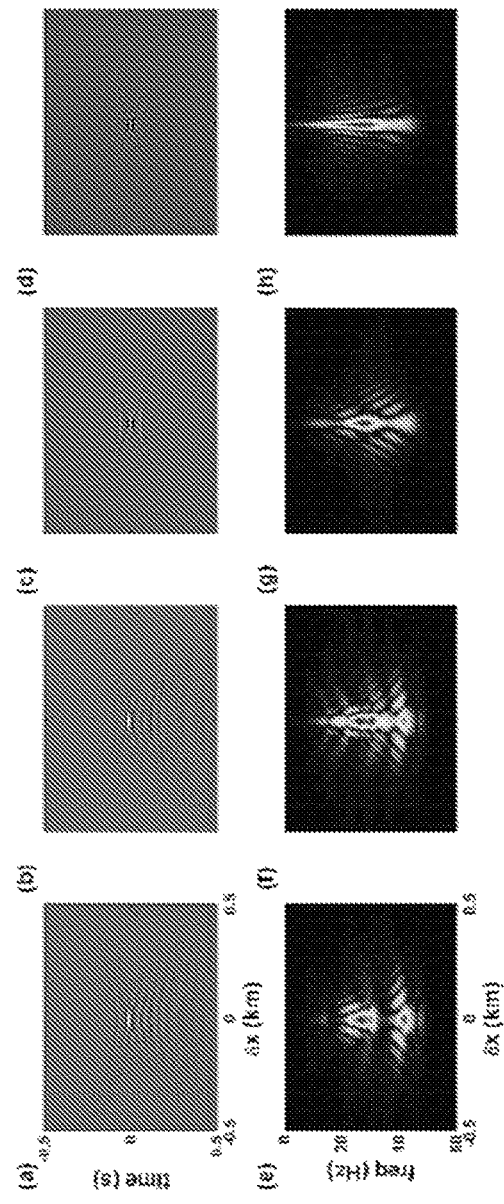
FIG. 14 illustrates differences between components of Joint PSF systems.

FIG. 14 displays components of JPSF systems for joint wavefields, which combine up-going and ghost fields from dipole-only sources, and combine up-going and ghost fields from both monopole and dipole source types. FIGS. 14a-h are the same as FIGS. 13a-h, except that FIGS. 14a-h correspond to different Joint Point-Spread Function systems.

By comparing the bottom panels of FIG. 14 with those of FIG. 13 it is noted that any of the joint-wavefield $\hat{C}_J$ and $\hat{\Gamma}_J$ have noticeably broader temporal bandwidth content than that of any of the single-field $\hat{C}$ and $\hat{\Gamma}$. In addition, the joint-wavefield PSF components are also richer in spatial bandwidth compared to their single-field counterparts; this is observable by noting that the $\hat{\Gamma}$ elements (right panels) in FIG. 14 are closer to bandlimited impulses at the origin when compared to those in FIG. 13.

Figure 15:
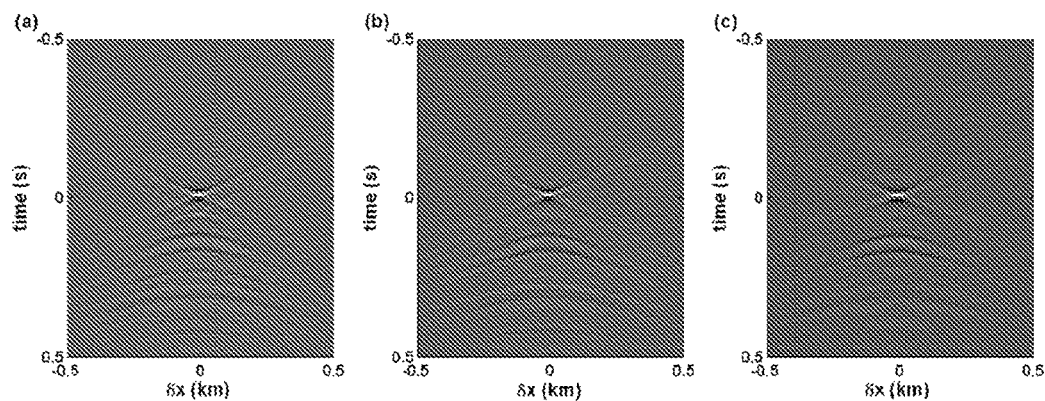
FIG. 15 illustrates several extended image examples from PSF or JPSF systems.

FIG. 15 displays extended images after multidimensional deconvolution (MDD). FIG. 15a corresponds to an inverted EI from a single-experiment PSF system (e.g. Eq 6), whereas FIGS. 15b and 15c result from joint deconvolution of multiple experiments, i.e., by solving the JPSF system in Eq 10. For brevity, FIG. 15 only shows inversion results using the column-space joint wavefield matrices (Eq 9), thus solving Eq 11 for the EIs. FIG. 15 shows that the JPSF based EIs (FIGS. 15b and 15c) contain fewer artifacts and are substantially more impulsive (i.e., broader bandwidth) than the ones in FIG. 15a. Both EIs in FIGS. 15b and 15c result from combining fields from dual sources, with the EI combining up-going and ghost fields from both source types yielding the best inverted EI result. This improvement in inverted EIs results not only from using the broader-bandwidth $\hat{\Gamma}_J$ (e.g., FIGS. 14d and 14h), but also from the increase in spatial and temporal resolution in $\hat{C}_J$ (e.g., FIGS. 14b and 140. When compared to the true model contrasts in FIG. 12, the inverted EI in FIG. 15c retrieves a true-amplitude reflectivity with accurate correspondence to the model features. This includes the separation of top and bottom reflectivity signals related to a thin layer at 0.76 km depth seen in the inverted EI gathers at approximately 0.3 seconds.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis on computing system 1600 in FIG. 16.

Figure 16:
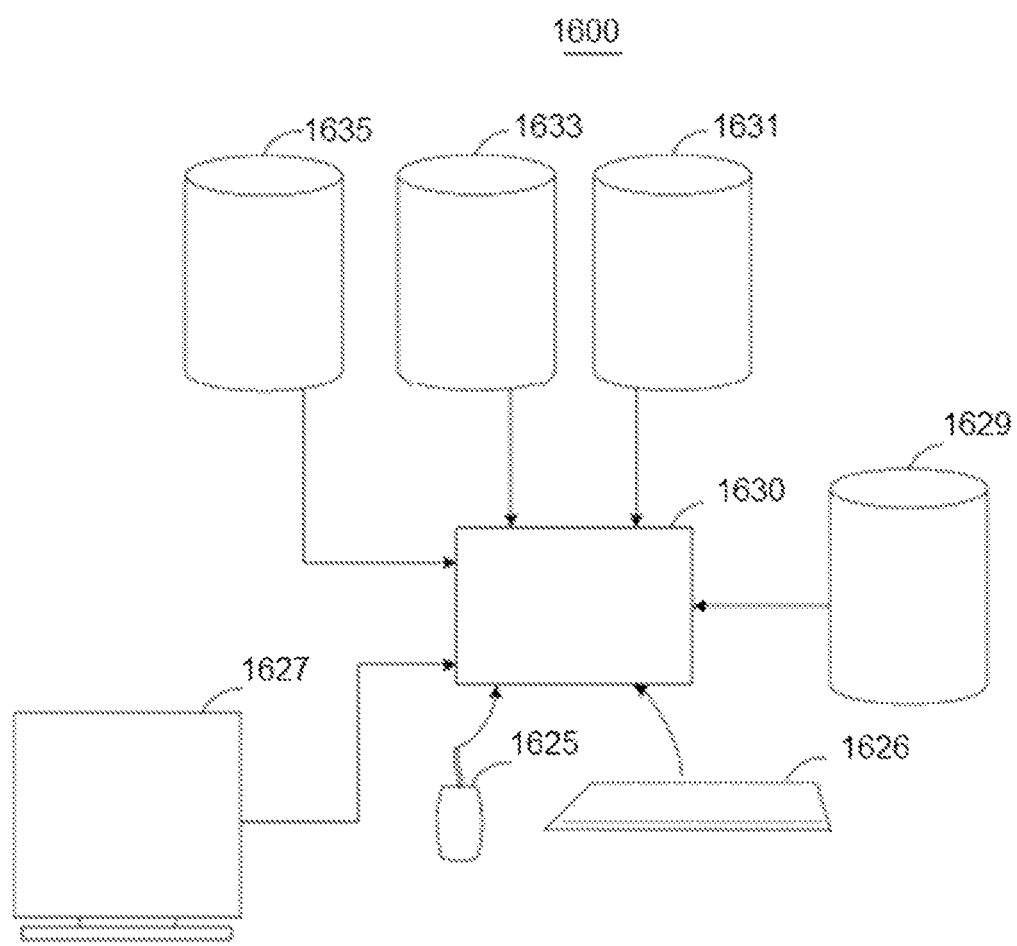
FIG. 16 illustrates a computer system which may implement at least parts of the methods described herein.

The methods described above are typically implemented in a computer system 1600, one of which is shown in FIG. 16. The system computer 1630 may be in communication with disk storage devices 1629, 1631, 1633 and 1635, which may be external hard disk storage devices. It is contemplated that disk storage devices 1629, 1631, 1633 and 1635 are conventional hard disk drives, and as such, will be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1631. Various non-seismic data from different sources may be stored in disk storage device 1633. The system computer 1630 may retrieve the appropriate data from the disk storage devices 1631 or 1633 to process data according to program instructions that correspond to implementations of various techniques described herein. The program instructions may be written in a computer programming language, such as C++, Java and the like. The program instructions may be stored in a computer-readable medium, such as program disk storage device 1635. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1630. Combinations of any of the above may also be included within the scope of computer readable media.

In one implementation, the system computer 1630 may present output primarily onto graphics display 1627, or alternatively via printer 1628 (not shown). The system computer 1630 may store the results of the methods described above on disk storage 1629, for later use and further analysis. The keyboard 1626 and the pointing device (e.g., a mouse, trackball, or the like) 1625 may be provided with the system computer 1630 to enable interactive operation.

The system computer 1630 may be located at a data center remote from an exploration field. The system computer 1630 may be in communication with equipment on site to receive data of various measurements. The system computer 1630 may also be located on site in a field to provide faster feedback and guidance for the field operation. Such data, after conventional formatting and other initial processing, may be stored by the system computer 1630 as digital data in the disk storage 1631 or 1633 for subsequent retrieval and processing in the manner described above. While FIG. 16 illustrates the disk storage, e.g. 1631 as directly connected to the system computer 1630, it is also contemplated that the disk storage device may be accessible through a local area network or by remote access. Furthermore, while disk storage devices 1629, 1631 are illustrated as separate devices for storing input seismic data and analysis results, the disk storage devices 1629, 1631 may be implemented within a single disk drive (either together with or separately from program disk storage device 1633), or in any other conventional manner as will be fully understood by one of skill in the art having reference to this specification.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for processing measurements at a datum, the method comprising:
   receiving at least two sets of measurements of a wavefield generated by at least one source emitting waves, the waves being disturbed by a subsurface target and received by at least one receiver;
   constructing a Joint Point Spread Function system using the at least two sets of measurements;
   obtaining reflectivity data by multi-dimensional deconvolution of the Joint Point Spread Function system;
   from the obtained reflectivity data, constructing or refining a physical model or image defining multiple subsurface structures; and
   from the model or image, identifying a location of a hydrocarbon deposit.

2. The method of claim 1, further comprising:
   extrapolating each of the at least two sets of measurements to obtain a source wavefield and a receiver wavefield for each of the at least two sets of measurements, wherein the reflectivity data comprises images or extended images.

3. The method of claim 1, wherein the at least one source and one of the at least one receiver are on the same side of the subterranean target.

4. The method of claim 1, wherein one or more of the at least one source and one or more of the at least one receiver are on opposite sides of the subterranean target.

5. The method of claim 1, wherein the wavefield comprises one of an acoustic wavefield, an ultrasound wavefield, an elastic wavefield, and an electromagnetic wavefield.

6. The method of claim 1, wherein the wavefield comprises one of a propagating wavefield and a dissipative wavefield.

7. The method of claim 1, wherein the at least two sets of measurements comprise two sets of measurements of the wavefields measured in two different experiments.

8. The method of claim 7, wherein:
   the two different experiments are selected from a group including at least one of a surface seismic survey, vertical seismic profiling, or a seismic-while-drilling survey; and
   the at least one source comprises either a single source or multiple simultaneous sources.

9. The method of claim 1, wherein the at least two sets of measurements comprise two sets of measurements processed from a single experiment, wherein the two processing methods are different.

10. The method of claim 1, wherein properties of the subterranean target are varied in a series of time-lapse experiments.

11. The method of claim 1, wherein:
   the at least one source comprises one of a monopole source, a dipole source, and a combination thereof;
   the at least one receiver comprises one of monopole receivers, dipole receivers, and a combination thereof;
   the at least one source has arbitrary temporal and spatial radiation characteristics; and
   the at least one receiver has an arbitrary temporal and spatial transfer functions.

12. The method of claim 1, wherein Joint Point-Spread Function system has a form of $C_J^- = R_{0,J}^+ \Gamma_J^+$ in matrix format, wherein $\Box J^+$ is the Joint Point-Spread Function (JPSF).

13. The method of claim 12, wherein the Joint Point-Spread Function has the form of a Least-Squares $\hat{\Gamma}_J^{\ddagger}$ or a minimum-norm $\hat{\Gamma}_J^{\mu}$.

14. A data processing system for processing imaging data, the system comprising:
   at least one processor and at least one computer readable storage wherein the computer readable storage comprises computer executable instructions, which when executed by the processor, causes the processor to perform a method as in claim 1.

15. A method for processing measurements at a datum, the method comprising:
   receiving at least one set of measurements of a wavefield generated by at least two sources emitting waves simultaneously, the waves being affected by a subterranean target and received by at least one receiver;
   constructing a Joint Point-Spread Function system using the at least one set of measurements of the wavefield affected by the subterranean target caused by the at least two sources; and
   obtaining reflectivity data by multi-dimensional deconvolution of the Joint Point-Spread Function system;
   from the obtained reflectivity data, constructing or refining a physical model or image defining multiple subsurface structures; and
   from the model or image, identifying a location of a hydrocarbon deposit.

16. A system for processing information about or an image of a subterranean target, comprising:
- a first set of one or more sources configured to illuminate the subterranean target with a first wave signal;
- a second set of one or more sources configured to illuminate the subterranean target with a second wave signal;
- a first set of one or more receivers disposed at a first datum and configured to measure a first wavefield produced by interactions of the subterranean target with the first wave signal;
- a second set of one or more receivers disposed at a second datum and configured to measure a second wavefield produced by interactions of the subterranean target with the second wave signal, wherein either the first and the second datums are different or the first and the second datums are the same and the first set of one or more sources comprise sources that are different to the second set of one or more sources; and
- a processor configured to:
  - construct a Joint Point-Spread Function system from the first and the second measured wavefields;
  - process single reflectivity data from the Joint Point-Spread Function system;
  - process single reflectivity data and construct an image defining multiple subsurface structures; and
  - from the image, identify a location of a hydrocarbon deposit.

17. The system of claim 16 wherein the first and the second wave signals comprise one of an acoustic signal and an electromagnetic signal.

18. The system of claim 16 wherein the types of sources include at least one of passive sources, active sources, simultaneous sources, or discrete sources.

19. A method for processing information about or an image of a subterranean target, comprising:
- performing a first measurement process, wherein the first measurement process comprises illuminating the subterranean target with a first signal from a first set of one or more sources and using a first set of one or more receivers at a first datum to measure a first wavefield produced by an interaction between the subterranean target and the first signal;
- performing a second measurement process, wherein the second measurement process comprises illuminating the subterranean target with a second signal from a second set of one or more sources and using a second set of one or more receivers at a second datum to measure a second wavefield produced by an interaction between the subterranean target and the second signal, wherein either:
  - the first and the second datums are the same and the first set of one or more sources comprise different types of sources than the second set of sources; or
  - at least one of the first and the second datum are different, the first and the second signals are different, or location of the first set of one or more sources are different from locations of the second location of one or more sources;
- constructing a Joint Point-Spread Function system from the first and the second measured wavefields;
- processing single reflectivity data from the Joint Point-Spread Function system;
- processing the single reflectivity data, and from the processed single reflectivity data constructing or refining a physical model or image defining multiple subsurface structures; and
- from the model or image, identifying a location of a hydrocarbon deposit.

20. The method of claim 19, wherein the first and the second signals comprise one of an acoustic signal and an electromagnetic signal.

21. The method of claim 19, wherein the first and second sets of sources are seismic sources, and the first and second sets of one or more receivers are seismic receivers, and wherein processing single reflectivity data from the Joint Point-Spread Function system comprises using a multi-dimensional convolution on subsurface reflectivity data and solving for a single set of images.

* * * * *